United States Patent
Kolli

(10) Patent No.: US 8,902,336 B2
(45) Date of Patent: Dec. 2, 2014

(54) DYNAMIC, LOCAL EDGE PRESERVING DEFECT PIXEL CORRECTION FOR IMAGE SENSORS WITH SPATIALLY ARRANGED EXPOSURES

(71) Applicant: AltaSens, Inc., Westlake Village, CA (US)

(72) Inventor: Naveen Kolli, Thousand Oaks, CA (US)

(73) Assignee: AltaSens, Inc., Westlake Village, CA (US)

( * ) Notice: Subject to any disclaimer, the term of this patent is extended or adjusted under 35 U.S.C. 154(b) by 215 days.

(21) Appl. No.: 13/754,844

(22) Filed: Jan. 30, 2013

(65) Prior Publication Data

US 2014/0211048 A1  Jul. 31, 2014

(51) Int. Cl.
| | | |
|---|---|---|
| *H04N 9/64* | (2006.01) | |
| *H04N 5/217* | (2011.01) | |
| *H04N 5/235* | (2006.01) | |
| *H04N 5/228* | (2006.01) | |
| *H04N 5/367* | (2011.01) | |

(52) U.S. Cl.
CPC ..................................... *H04N 5/367* (2013.01)
USPC .......................... 348/246; 348/241; 348/222.1

(58) Field of Classification Search
None
See application file for complete search history.

(56) References Cited

U.S. PATENT DOCUMENTS

| | | | |
|---|---|---|---|
| 2007/0076269 A1* | 4/2007 | Kido et al. ..................... | 358/474 |
| 2008/0129847 A1* | 6/2008 | Kobayashi et al. ............ | 348/243 |
| 2010/0141792 A1* | 6/2010 | Arai ............................ | 348/229.1 |
| 2011/0032393 A1* | 2/2011 | Yamaguchi .................... | 348/247 |
| 2012/0281111 A1* | 11/2012 | Jo et al. ....................... | 348/229.1 |
| 2014/0027613 A1* | 1/2014 | Smith ......................... | 250/208.1 |
| 2014/0184894 A1* | 7/2014 | Motta ........................... | 348/362 |

\* cited by examiner

*Primary Examiner* — Aung S Moe
*Assistant Examiner* — Euel Cowan
(74) *Attorney, Agent, or Firm* — Medley, Behrens & Lewis, LLC

(57) ABSTRACT

Various technologies described herein pertain to defect pixel correction for image data collected by a pixel array of an image sensor with spatially arranged exposures. The pixel array includes a first subset of pixels having a first exposure time and a second subset of pixels having a second exposure time. An exposure ratio (ratio of first exposure time to second exposure time) is received. A value of at least a particular neighbor pixel of a given pixel from the image data is adjusted based upon the exposure ratio. Neighborhood statistics for the given pixel from the image data are computed based on values of neighbor pixels of the given pixel from the image data as adjusted. Whether the value of the given pixel is defective is detected based on the neighborhood statistics. The value of the given pixel is replaced when detected to be defective to output modified image data.

26 Claims, 17 Drawing Sheets

| $G_R$ | B | $G_R$ | B | $G_R$ | B | $G_R$ | B |
| --- | --- | --- | --- | --- | --- | --- | --- |
| R | $G_B$ | R | $G_B$ | R | $G_B$ | R | $G_B$ |
| $G_R$ | B | $G_R$ | B | $G_R$ | B | $G_R$ | B |
| R | $G_B$ | R | $G_B$ | R | $G_B$ | R | $G_B$ |
| $G_R$ | B | $G_R$ | B | $G_R$ | B | $G_R$ | B |
| R | $G_B$ | R | $G_B$ | R | $G_B$ | R | $G_B$ |
| $G_R$ | B | $G_R$ | B | $G_R$ | B | $G_R$ | B |
| R | $G_B$ | R | $G_B$ | R | $G_B$ | R | $G_B$ |

| $A_{1,5}$ |  | $A_{3,5}$ |  | $A_{5,5}$ |
|---|---|---|---|---|
|  |  |  |  |  |
| $A_{1,3}$ |  | $A_{3,3}$ |  | $A_{5,3}$ |
|  |  |  |  |  |
| $A_{1,1}$ |  | $A_{3,1}$ |  | $A_{5,1}$ |

DYNAMIC, LOCAL EDGE PRESERVING DEFECT PIXEL CORRECTION FOR IMAGE SENSORS WITH SPATIALLY ARRANGED EXPOSURES

BACKGROUND

An image sensor is a device that can convert an optical image into an electronic signal. Image sensors are often times utilized in still cameras, video cameras, video systems, and other imaging devices. Cameras and other imaging devices commonly employ either a charge-coupled device (CCD) image sensor or a complementary metal-oxide-semiconductor (CMOS) image sensor.

CMOS image sensors include an array of pixels, each of which can comprise a photodetector. CMOS image sensors also include circuitry to convert light energy to an analog voltage. Moreover, CMOS image sensors can include additional circuitry to convert the analog voltage to digital data. Thus, a CMOS image sensor can be an integrated circuit that comprises various analog, digital, mixed-signal, etc. components associated with capturing light and processing imaging related information; accordingly, a CMOS image sensor can be a system on chip (SoC). For example, components integrated into the CMOS image sensor oftentimes include a processor module (e.g., microprocessor, microcontroller, or digital signal processor (DSP) core), memory, analog interfaces (e.g., analog to digital converters, digital to analog converters), and so forth.

Visible imaging systems implemented using CMOS image sensors can reduce costs, power consumption, and noise while improving resolution. For instance, cameras can use CMOS image sensors that efficiently marry low-noise image detection and signal processing with multiple supporting blocks that can provide timing control, clock drivers, reference voltages, analog to digital conversion, digital to analog conversion, key signal processing elements, and the like. High-performance video cameras can thereby be assembled using a single CMOS integrated circuit supported by few components including a lens and a battery, for instance. Accordingly, by leveraging CMOS image sensors, camera size can be decreased and battery life can be increased. Also, dual-use cameras have emerged that can employ CMOS image sensors to alternately produce high-resolution still images or high definition (HD) video.

Image sensors oftentimes have defect pixels, which can appear as undesirable outliers when a final image is formed. Defect pixels can have a variety of root causes such as high dark current, faulty transistors, or the like. Moreover, a number of defect pixels may change from image to image as a function of conditions in which a camera is operated such as scene, camera temperature, amount of light, and so forth. For instance, an image obtained by an image sensor may have 1000 defect pixels and a different image obtained by the same image sensor may have 100 defect pixels.

Conventional image processing pipes oftentimes include some type of static pixel correction or dynamic pixel correction. However, performances of conventional approaches vary widely from algorithm to algorithm. For instance, typical static pixel correction approaches are oftentimes inflexible, and thereby unable to mitigate defects that occur intermittently. Moreover, conventional dynamic pixel correction techniques commonly attempt to detect defective pixels as an image is processed, and replace pixels detected to be defective with fair approximations based on a remainder of the image.

SUMMARY

Described herein are various technologies that pertain to defect pixel correction for image data collected by a pixel array of an image sensor with spatially arranged exposures. The pixel array includes a first subset of pixels having a first exposure time and a second subset of the pixels having a second exposure time. The first subset of the pixels and the second subset of the pixels can be spatially arranged in the pixel array according to a pattern. The first exposure time and the second exposure time can be the same when the image sensor operates in a non-wide dynamic range mode. Alternatively, the first exposure time and the second exposure time can differ when the image sensor operates in a wide dynamic range mode. An exposure ratio (ratio of first exposure time to second exposure time) for the pixel array can be received, and a value of at least a particular neighbor pixel of a given pixel from the image data can be adjusted based upon the exposure ratio. Neighborhood statistics for the given pixel from the image data can be computed based on values of neighbor pixels of the given pixel from the image data as adjusted. Whether the value of the given pixel is defective can be detected based on the neighborhood statistics. The value of the given pixel can be replaced when detected to be defective to output modified image data. Correction of the given pixel can be a function of whether the given pixel is in a flat region or a non-flat region. When the given pixel is defective and in a non-flat region, a minimum edge across the given pixel can be identified and the value of the given pixel can be replaced with an average of values of neighbor pixels that belong to the minimum edge.

According to various embodiments, whether the value of the given pixel is defective can be dynamically detected based on the neighborhood statistics. Thus, whether the neighbor pixels cover a flat region or a non-flat region can be detected based upon the neighborhood statistics. Moreover, a predefined parameter can be selected as a function of whether the neighbor pixels cover the flat region or the non-flat region. A high threshold and a low threshold can be computed based upon the selected predefined parameter and the neighborhood statistics. Further, the value of the given pixel from the image data can be detected to be defective when greater than the high threshold or less than the low threshold. Additionally or alternatively, a static defect pixel map can be checked to determine whether the value of the given pixel from the image data is defective (e.g., static detection).

In accordance with various embodiments, when the given pixel from the image data is detected to be defective, the value of the given pixel can be replaced with a central tendency measure of the values of the neighbor pixels when the neighbor pixels are detected to cover a flat region, or replaced with an average of values of the neighbor pixels that belong to a minimum edge when the neighbor pixels are detected to cover a non-flat region. Pursuant to various embodiments, when the given pixel from the image data is detected to be defective and the neighbor pixels are detected to cover a non-flat region, then a subset of the values of the neighbor pixels can be respectively compared to the high threshold and the low threshold. The subset of the values of the neighbor pixels have yet to be processed, while a remainder of the values of the neighbor pixels have been previously processed. Further, the values of the neighbor pixels from the subset respectively determined to be greater than the high threshold or less than the low threshold can be replaced with a predefined temporary value. Magnitudes of a plurality of edges across the given pixel can thereafter be computed subsequent to such replacement. Moreover, a minimum edge having a minimum magnitude from the magnitudes of the plurality of edges can be identified, and the value of the given pixel from the image data can be replaced with the average of the values of the neighbor pixels that belong to the minimum edge.

According to various embodiments, when the first exposure time differs from the second exposure time (e.g., when the image sensor operates in a wide dynamic range mode), it can be detected whether a condition exists. Upon detection of the existence of the condition, replacement of the value of the given pixel from the image data can be inhibited regardless whether detected to be defective.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 illustrates an exemplary portion of a pixel array that supports a wide dynamic range mode with subsets of pixels having respective exposure times spatially arranged according to an exemplary pattern.

FIG. 4 illustrates an exemplary portion of a pixel array that supports a wide dynamic range mode with subsets of pixels having respective exposure times spatially arranged according to another exemplary pattern.

FIG. 5 illustrates an exemplary portion of a pixel array that includes a given pixel and a neighborhood of the given pixel.

FIG. 7 illustrates another exemplary portion of a pixel array that includes a given pixel and a neighborhood of the given pixel, where subsets of the pixels are spatially arranged according to the exemplary pattern of FIG. 4.

DETAILED DESCRIPTION

Figure 1:
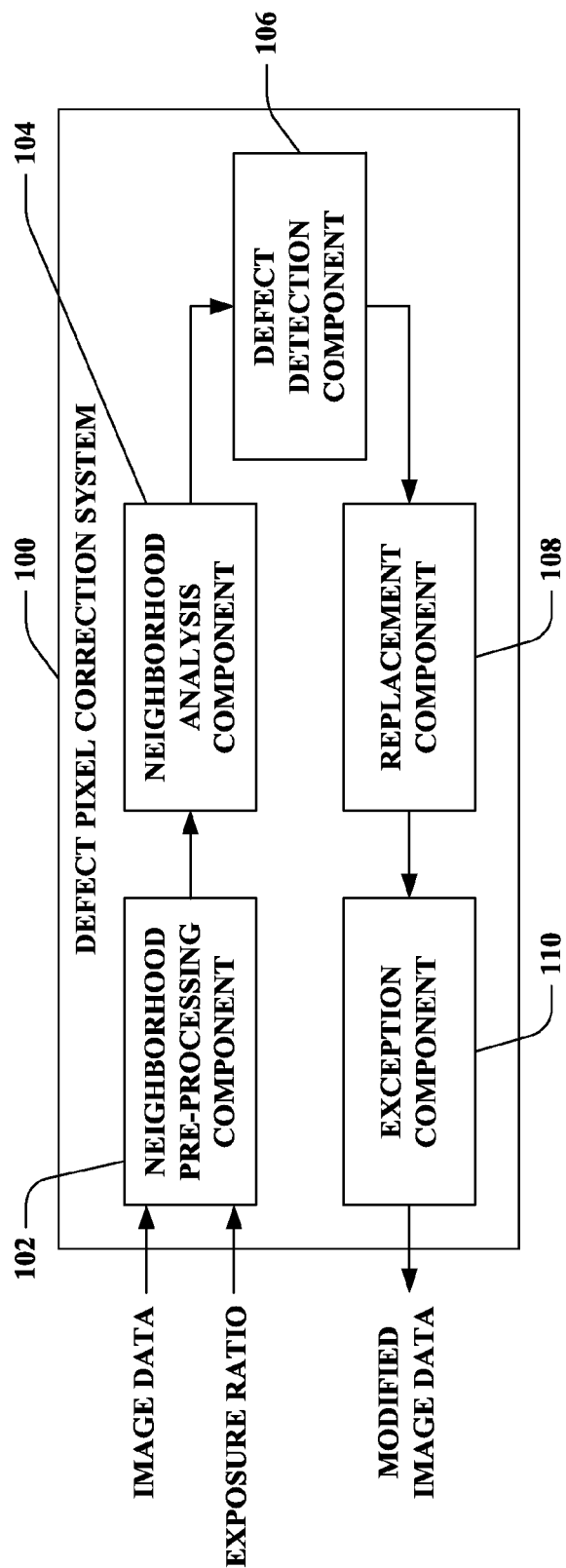
FIG. 1 illustrates an exemplary defect pixel correction system that corrects defect pixels for image data collected by a pixel array of an image sensor with spatially arranged exposures.

Various technologies pertaining to dynamically detecting and correcting defective pixels, while preserving local edges, in image data collected by a pixel array of an image sensor with a wide dynamic range are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, defective pixels in image data collected by a pixel array of an image sensor can be dynamically detected and corrected. Defect pixel correction approaches provided herein can maintain image quality and resolution, while correcting defective pixels. Moreover, the defect pixel correction approaches described herein can be dynamic and can preserve local edges.

Referring now to the drawings, FIG. 1 illustrates a defect pixel correction system 100 that corrects defect pixels for image data collected by a pixel array of an image sensor with spatially arranged exposures. The image sensor can support a wide dynamic range mode using a pixel array that includes a first subset of pixels having a first exposure time and a second subset of pixels having a second exposure time. The first subset of the pixels and the second subset of the pixels can be spatially arranged in the pixel array according to a pattern.

The terms first exposure time and second exposure time herein refer to lengths of time. When operating in the wide dynamic range mode, the pixel array can include pixels that have differing exposure times (e.g., the first exposure time differs from the second exposure time). Thus, when in the wide dynamic range mode, the pixel array supports two distinct exposure times (e.g., a long exposure time and a short exposure time). Further, when in the non-wide dynamic range mode, the image sensor includes pixels that have a common exposure time (e.g., the first exposure time and the second exposure time is the same).

The defect pixel correction system 100 can receive the image data collected by the pixel array of the image sensor. The image data can pertain to a still image, a frame of a video, etc. Further, the defect pixel correction system 100 can remove outlier pixels from the image data (e.g. from the still image, on a frame by frame basis from the video, etc.).

The image data can include pixel values outputted from the pixel array of the image sensor. Moreover, the defect pixel correction system 100 can process pixels across a row of the pixel array, then pixels across a next row of the pixel array, and so forth. A pixel being processed (e.g., pixel under consideration) by the defect pixel correction system 100 is referred to herein as a given pixel.

Although not shown, it is contemplated that the image data (or a portion thereof) can be retained in a buffer. For example, five line buffers can retain pixel values outputted from five rows of the pixel array of the image sensor. Accordingly, the defect pixel correction system 100 can be compact by employing a limited amount of such hardware resource.

The defect pixel correction system 100 can receive an exposure ratio for the pixel array. The exposure ratio is a ratio of the first exposure time of the first subset of the pixels of the pixel array to the second exposure time of the second subset of the pixels of the pixel array. Thus, the relation between the two exposure times can be set forth as follows:

$$\text{exposure ratio} = \frac{\text{first exposure time}}{\text{second exposure time}}.$$

When operating in the non-wide dynamic range mode, the first exposure time is the same as the second exposure time, and hence, the exposure ratio equals one. Alternatively, when operating in the wide dynamic range mode, the first exposure time and the second exposure time differ; thus, the exposure ratio is not equal to one. In accordance with an example, the first exposure time can be the long exposure time and the second exposure time can be the short exposure time; following this example, the exposure ratio can be greater than one when operating in the wide dynamic range mode (or one when operating in the non-wide dynamic range mode).

Moreover, the defect pixel correction system 100 includes a neighborhood pre-processing component 102 that can receive the exposure ratio for the pixel array. The neighborhood pre-processing component 102 can adjust a value of at least a particular neighbor pixel of the given pixel from the image data based upon the exposure ratio. If the first exposure time is equal to the second exposure time (e.g., the exposure ratio is one, the image sensor is operating in the non-wide dynamic range mode), then the neighborhood pre-processing component 102 need not adjust neighbor pixel(s) of the given pixel from the image data; following this example, the particular neighbor pixel need not be adjusted when the first exposure time is equal to the second exposure time. Alternatively, if the first exposure time differs from the second exposure time (e.g., the exposure ratio is not one, the image sensor is operating in the wide dynamic range mode), then one or more neighbor pixels (e.g., the particular neighbor pixel, other neighbor pixel(s)) of the given pixel from the image data can be adjusted based upon the exposure ratio.

According to various examples set forth herein, neighbor pixels and the given pixel can belong to a particular Bayer domain. Moreover, each of the neighbor pixels can be vertically, horizontally or diagonally adjacent to the given pixel within the particular Bayer domain. However, according to other examples, it is contemplated that the image sensor with the spatially arranged exposures can include a color filter array that has a pattern other than the Bayer pattern; hence, the neighbor pixels of the given pixel can be dependent upon the pattern of the color filter array.

Further, the neighbor pixels of the given pixel include the particular neighbor pixel. One of the neighbor pixels of the given pixel that is included in a differing subset of the pixels of the pixel array as compared to a subset of the pixels of the pixel array that includes the given pixel is referred to herein as the particular neighbor pixel. While many of the examples set forth herein pertain to adjustment of the particular neighbor pixel, it is contemplated that other neighbor pixels that are included in the differing subset of the pixels of the pixel array can similarly be adjusted.

The neighborhood pre-processing component 102 can adjust neighbor pixels that have a differing exposure time as compared to an exposure time of the given pixel when operating in the wide dynamic range mode. Moreover, the neighborhood pre-processing component 102 can be inhibited from adjusting neighbor pixels that have the same exposure time as compared to an exposure time of the given pixel when operating in the wide dynamic range mode.

The defect pixel correction system 100 can further include a neighborhood analysis component 104 that computes neighborhood statistics for the given pixel from the image data based on values of the neighbor pixels of the given pixel from the image data as adjusted by the neighborhood pre-processing component 102. The neighborhood statistics computed by the neighborhood analysis component 104 include a standard deviation of the values of the neighbor pixels and a central tendency measure of the values of the neighbor pixels. The central tendency measure of the values of the neighbor pixels can be a mean of the values of the neighbor pixels or a median of the values of the neighbor pixels. According to an example, the neighborhood analysis component 104 can compute the standard deviation of the values of the neighbor pixels, the mean of the values of the neighbor pixels, and the median of the values of the neighbor pixels; yet, it is contemplated that the claimed subject matter is not so limited. Moreover, whether the central tendency measure is the mean of the values of the neighbor pixels or the median of the values of the neighbor pixels can be predefined, altered responsive to an input (e.g., user selection, etc.), or the like.

Moreover, the defect pixel correction system 100 includes a defect detection component 106 that detects whether a value of the given pixel from the image data is defective based upon the neighborhood statistics. The defect detection component 106 can dynamically identify whether the value of the given pixel is defective (e.g., without using predefined knowledge of defective pixels). Additionally or alternatively, the defect detection component 106 can statically identify whether the value of a given pixel is defective. By way of illustration, whether the defect detection component 106 employs dynamic and/or static detection for discerning whether the given pixel is defective can be predefined, altered responsive to an input (e.g., user selection, etc.), and so forth; however, the claimed subject matter is not so limited.

The defect pixel correction system 100 further includes a replacement component 108 that replaces the value of the given pixel from the image data when detected to be defective by the defect detection component 106. Accordingly, modified image data can be outputted by the replacement component 108. The replacement component 108 can replace the value of the given pixel in a similar manner regardless whether the defect detection component 106 detects that the value of the given pixel is defective employing the dynamic approach and/or the static approach set forth herein.

Moreover, the defect pixel correction system 100 can include an exception component 110 that detects whether a condition exists when the first exposure time differs from the second exposure time (e.g., when the image sensor operates in the wide dynamic range mode). Upon detection of the existence of the condition, the exception component 110 can inhibit replacement (e.g., by the replacement component 108) of the value of the given pixel from the image data regardless whether detected to be defective (e.g., by the defect detection component 106). Although not shown, it is contemplated that the exception component 110 can be included in the neighborhood pre-processing component 102, the neighborhood analysis component 104, the defect detection component 106, the replacement component 108, a combination thereof, or the like. Moreover, it is contemplated that the exception component 110 can obtain output from the neighborhood analysis component 104 and cause the defect detection component 106 to skip detecting whether the value of the given pixel from the image data is defective upon detection of the existence of the condition; however, the claimed subject matter is not so limited.

The defect pixel correction system 100 can implement a pixel correction algorithm that maintains resolution and image quality while correcting defective pixels in the Bayer domain. The defect pixel correction system 100 can be effective in both correcting defective pixels and preserving image quality. The defect pixel correction system 100 can preserve image quality by preserving edges in an image (e.g., not blurring edges). More particularly, the defect pixel correction system 100 can perform real time defect pixel correction using information from pixels within the same color (e.g., pixels within the particular Bayer domain). Further, the replacement component 108 can replace the value of the given pixel with a value based upon a minimum edge magnitude in a local region within the pixel array to enhance final image quality. Thus, a scene can be locally interpreted, and the replacement component 108 can replace the value of the given pixel with an appropriate value rather than blurring across edges within the image.

The algorithm implemented by the defect pixel correction system 100 can use few inputs (e.g., user selections, etc.). Moreover, parameters (e.g., chosen responsive to the inputs) used by the defect pixel correction system 100 need not be adjusted online as image content changes; however, it is contemplated that parameters can be adjustable online, if desired.

Figure 2:
FIG. 2 illustrates an exemplary portion of a pixel array that includes pixels in differing Bayer domains.

Turning to FIG. 2, illustrated is a portion 200 of a pixel array that includes pixels in differing Bayer domains. As shown in the portion 200, the pixel array includes four types of pixels that belong to differing Bayer domains. The four types of pixels include red pixels (R), green pixels next to red pixels ($G_R$) (e.g., in the same row as the red pixels), blue pixels (B), and green pixels next to blue pixels ($G_B$) (e.g., in the same row as the blue pixels). The red pixels (R) include photodiodes operative based upon obtaining red light, the green pixels ($G_R$) include photodiodes that operate based upon obtaining green light, the green pixels ($G_B$) include photodiodes operative based upon obtaining green light, and the blue pixels (B) include photodiodes that operate based upon obtaining blue light. The green pixels, $G_B$ and $G_R$, are differentiated from each other based upon the alternating color in the respective row, and such differentiation provides a manner of identifying four separate Bayer domains.

The pixel array can include substantially any number of pixels. The portion 200 of the pixel array illustrated in FIG. 2 shows a pattern of the four types of pixels that belong to the disparate Bayer domains that can be utilized across the pixel array. However, it is to be appreciated that other patterns are intended to fall within the scope of the hereto appended claims.

Figure 3:
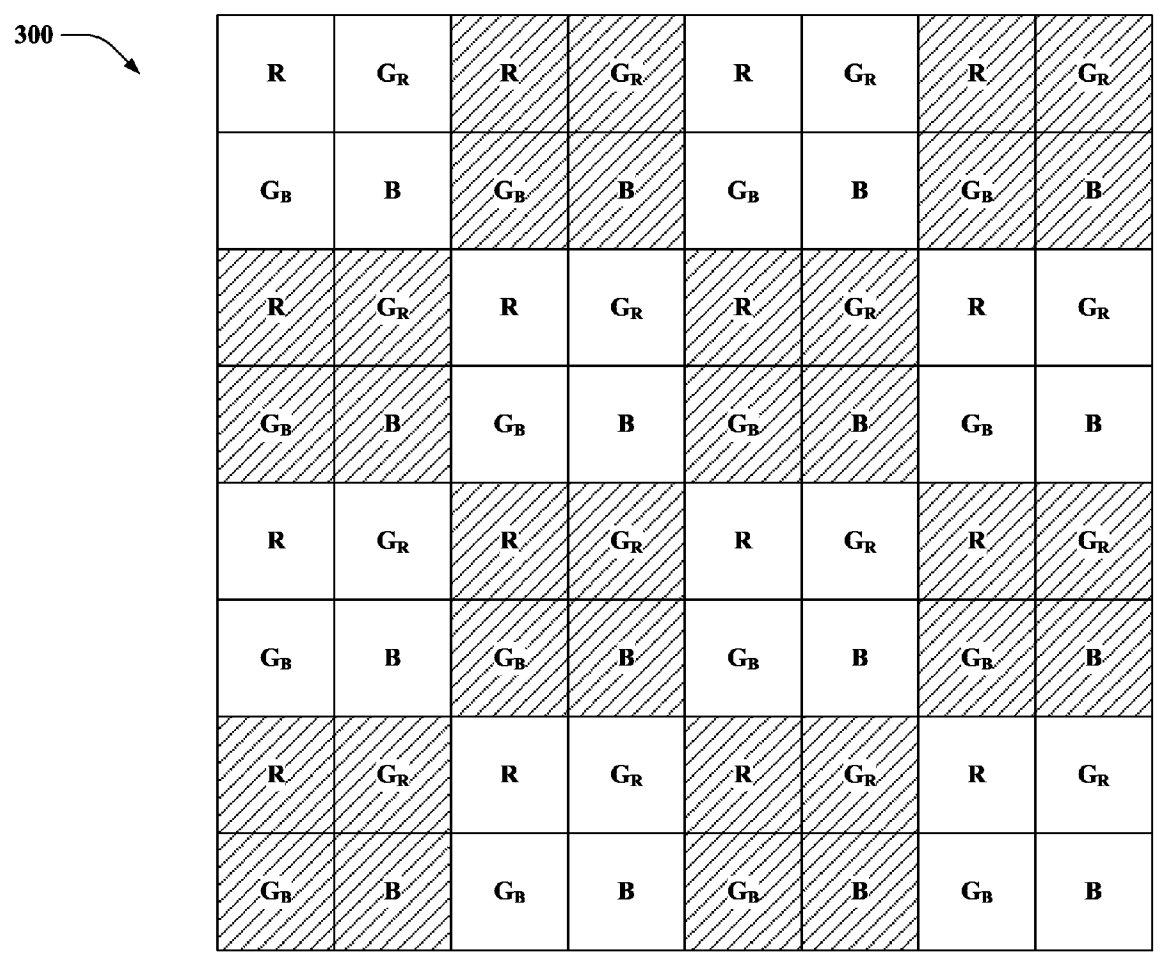

With reference to FIG. 3, illustrated is a portion 300 of a pixel array that supports a wide dynamic range mode with subsets of pixels having respective exposure times spatially arranged according to an exemplary pattern. The pixel array can be included in an image sensor with a wide dynamic range as described in U.S. patent application Ser. No. 12/586,060, filed Sep. 16, 2009, and entitled "IMAGE SENSOR WITH WIDE DYNAMIC RANGE", the entirety of which is incorporated herein by reference. As shown in FIG. 3, the differing subsets of the pixels of the pixel array having respective exposure times (e.g., integration times) are spatially arranged in the portion 300 of the pixel array according to a checkerboard pattern. The exposure times can be programmatically varied, and thus, the dynamic range of the image sensor can be altered. Moreover, since differing exposure times can be combined in a single contiguous frame of the pixel array, there can be negligible motion artifacts compared to conventional wide dynamic range images.

As shown in FIG. 3, alternating sub-blocks of pixels can be formed. Each sub-block can include a pixel from each Bayer domain, namely, a red pixel (R), a green pixel next to the red pixel ($G_R$), a blue pixel (B), and a green pixel next to the blue pixel ($G_B$). A first subset of the sub-blocks (depicted as shaded boxes in FIG. 3) can be triggered for the first exposure time, and the remaining subset of the sub-blocks (depicted as white boxes in FIG. 3) can be triggered for the second exposure time. When the image sensor operates in the wide dynamic range mode, the first exposure time differs from the second exposure time. The foregoing can result in an orthogonal checkerboard pattern of light exposure and dark exposure areas, wherein each sub-block is a self-contained resolution block. By capturing long exposure and short exposure pixels within the same frame, the image sensor can be capable of capturing a wide dynamic range with a minimum amount of motion artifacts. Further, wide dynamic range information can be outputted, where resolution can be relatively uncompromised relative to conventional sensors with other wide dynamic range sensors. Further, when the image sensor operates in the non-wide dynamic range mode, the first exposure time can be the same as the second exposure time.

Referring to FIG. 4, illustrated is a portion 400 of a pixel array that supports a wide dynamic range mode with subsets of pixels having respective exposure times spatially arranged according to another exemplary pattern. FIG. 4 depicts the differing subsets of the pixels of the pixel array having respective exposure times (e.g., integration times) being spatially arranged in the portion 400 of the pixel array according to a striped pattern. Again, the exposure times can be programmatically varied, and thus, the dynamic range of an image sensor that includes such pixel array can be altered.

As shown in FIG. 4, alternating stripes of pixels can be formed. Each stripe can include two adjacent rows of pixels. A first subset of the stripes (depicted as shaded boxes in FIG. 4) can be triggered for the first exposure time, and the remaining subset of the stripes (depicted as white boxes in FIG. 4) can be triggered for the second exposure time. When the image sensor operates in the wide dynamic range mode, the first exposure time differs from the second exposure time. The foregoing can result in a striped pattern of light exposure and dark exposure areas. Moreover, when the image sensor operates in the non-dynamic range mode, the first exposure time can be the same as the second exposure time.

While FIGS. 3-4 illustrate two exemplary patterns of spatial arrangements of the subsets of pixels having the respective exposure times, it is contemplated that other patterns of the spatial arrangements are intended to fall within the scope of the hereto appended claims.

Figure 5:
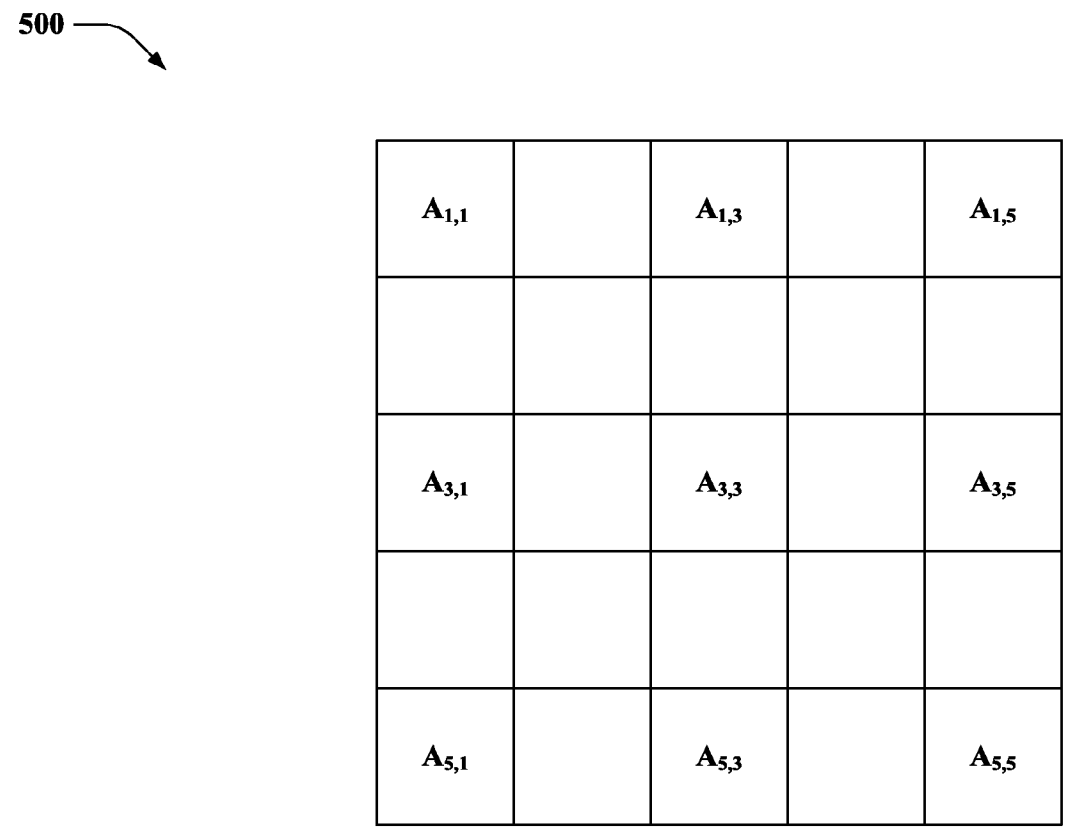

Now turning to FIG. 5, illustrated is a portion 500 of a pixel array that includes a given pixel and a neighborhood of the given pixel. As shown in FIG. 5, a given pixel $A_{3,3}$ can be evaluated to determine whether it is a defective pixel. Accordingly, a neighborhood for the given pixel $A_{3,3}$ can be formed. Neighbor pixels of the given pixel $A_{3,3}$ and the given pixel $A_{3,3}$ belong to a particular Bayer domain (e.g., belong to the same Bayer domain). Thus, the pixel $A_{3,3}$ and its neighbor pixels are one of red pixels (R), green pixels next to red pixels ($G_R$), blue pixels (B), or green pixels next to blue pixels ($G_B$) (e.g., as shown in FIG. 2).

Each of the neighbor pixels of the given pixel $A_{3,3}$ are either vertically, horizontally, or diagonally adjacent to the given pixel $A_{3,3}$ within the particular Bayer domain. Thus, as shown in FIG. 5, the neighbor pixels of the given pixel $A_{3,3}$ include a pixel $A_{1,1}$, a pixel $A_{1,3}$, a pixel $A_{1,5}$, a pixel $A_{3,1}$, a pixel $A_{3,5}$, a pixel $A_{5,1}$, a pixel $A_{5,3}$, and a pixel $A_{5,5}$. The neighbor pixels are collectively referred to herein as a neighborhood of the given pixel $A_{3,3}$. As illustrated, the pixel $A_{1,3}$ and the pixel $A_{5,3}$ are vertically adjacent to the given pixel $A_{3,3}$ within the Bayer domain (e.g., within the same column of the pixel array). Moreover, the pixel $A_{3,1}$ and the pixel $A_{3,5}$ are horizontally adjacent to the given pixel $A_{3,3}$ within the particular Bayer domain (e.g., within the same row of the pixel array). Further, the pixel $A_{1,1}$, the pixel $A_{1,5}$, the pixel $A_{5,1}$, and the pixel $A_{5,5}$, are diagonally adjacent to the given pixel $A_{3,3}$, within the particular Bayer domain. Moreover, pixels shown in FIG. 5 that are unlabeled belong to other Bayer domains as compared to the Bayer domain of the given pixel $A_{3,3}$; the pixels that belong to the other Bayer domains are not included in the neighborhood of the given pixel $A_{3,3}$.

The pixel $A_{1,1}$, the pixel $A_{1,3}$, the pixel $A_{1,5}$, and the pixel $A_{3,1}$ have previously been processed, replaced if determined to be defective, and are considered to be non-defective pixels when evaluating whether the given pixel $A_{3,3}$ is a defective pixel. One or more of these pixels may be boundary pixels (e.g., the first two columns and the last two columns in an image and the first two rows and the last two rows in an image are boundary pixels), which are considered to be non-defective pixels. These pixels are collectively referred to herein as a pre-neighborhood of the given pixel $A_{3,3}$. Moreover, the pixel $A_{3,5}$, the pixel $A_{5,1}$, the pixel $A_{5,3}$, and the pixel $A_{5,5}$, have yet to be processed, and therefore may or may not be defective. These pixels are collectively referred to herein as a post-neighborhood of the given pixel $A_{3,3}$.

The neighbor pixels are used to determine if the given pixel $A_{3,3}$ is a defective pixel. Thus, upon forming a neighborhood for the given pixel $A_{3,3}$, the neighborhood analysis component 104 of FIG. 1 can compute the neighborhood statistics for the given pixel $A_{3,3}$ from the image data based on the values of the neighbor pixels of the given pixel from the image data, the defect detection component 106 of FIG. 1 can detect whether the value of the given pixel $A_{3,3}$, from the image data is defective, and the replacement component 108 of FIG. 1 can replace the value of the given pixel $A_{3,3}$ from the image data when detected to be defective.

Figure 6:
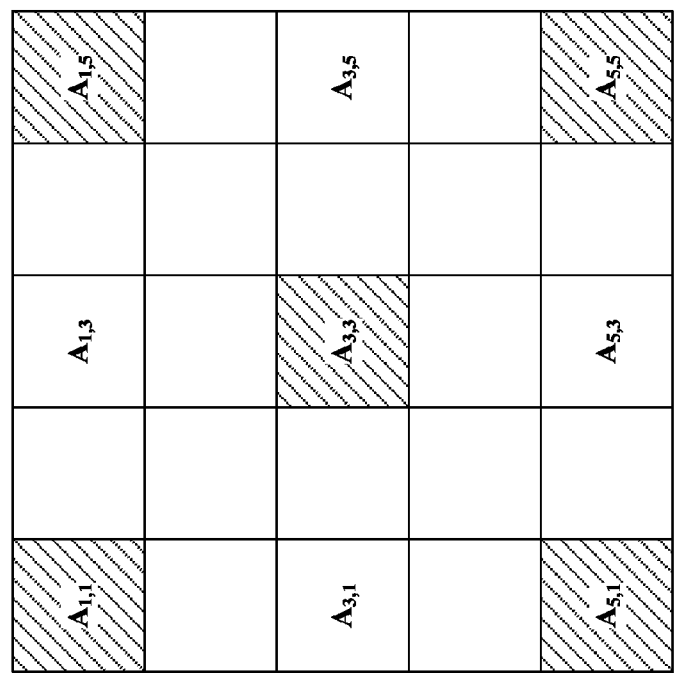
FIG. 6 illustrates another exemplary portion of a pixel array that includes a given pixel and a neighborhood of the given pixel, where subsets of the pixels are spatially arranged according to the exemplary pattern of FIG. 3.

With reference to FIG. 6, illustrated is a portion 600 of a pixel array that includes a given pixel and a neighborhood of the given pixel, where subsets of the pixels are spatially arranged according to the exemplary pattern of FIG. 3. Similar to the discussion above pertaining to FIG. 5, the given pixel $A_{3,3}$ can be evaluated to determine whether it is a defective pixel and the neighborhood for the given pixel $A_{3,3}$ can be formed. Again, the neighbor pixels of the given pixel $A_{3,3}$ include the pixel $A_{1,1}$, the pixel $A_{1,3}$, the pixel $A_{1,5}$, the pixel $A_{3,1}$, the pixel $A_{3,5}$, the pixel $A_{5,1}$, the pixel $A_{5,3}$, and the pixel $A_{5,5}$. Further, the pre-neighborhood of the given pixel $A_{3,3}$ includes the pixel $A_{1,1}$, the pixel $A_{1,3}$, the pixel $A_{1,5}$, and the pixel $A_{3,1}$, and the post-neighborhood of the given pixel $A_{3,3}$ includes the pixel $A_{3,5}$, the pixel $A_{5,1}$, the pixel $A_{5,3}$, and the pixel $A_{5,5}$.

In the example set forth in FIG. 6, the given pixel $A_{3,3}$ as well as the neighbor pixels that are diagonally adjacent to the given pixel $A_{3,3}$ within the particular Bayer domain are included in the first subset of the pixels of the pixel array having the first exposure time. Thus, the given pixel $A_{3,3}$ as well as the pixel $A_{1,1}$, the pixel $A_{1,5}$, the pixel $A_{5,1}$, and the pixel $A_{5,5}$ are each exposed for the first exposure time. Moreover, the neighbor pixels that are horizontally adjacent or vertically adjacent to the given pixel $A_{3,3}$ are included in the second subset of the pixels of the pixel array having the second exposure time. Accordingly, the pixel $A_{1,3}$, the pixel $A_{3,1}$, the pixel $A_{3,5}$, and the pixel $A_{5,3}$ are each exposed for the second exposure time. Pursuant to another example (not shown), the given pixel $A_{3,3}$ as well as the neighbor pixels that are diagonally adjacent to the given pixel $A_{3,3}$ within the particular Bayer domain (e.g., the pixel $A_{1,1}$, the pixel $A_{1,5}$, the pixel $A_{5,1}$, and the pixel $A_{5,5}$) can be included in the second subset of the pixels of the pixel array having the second exposure time, and the neighbor pixels that are horizontally adjacent or vertically adjacent to the given pixel $A_{3,3}$ (e.g., the pixel $A_{1,3}$, the pixel $A_{3,1}$, the pixel $A_{3,5}$, and the pixel $A_{5,3}$) can be included in the first subset of the pixels of the pixel array having the first exposure time.

When the given pixel $A_{3,3}$ is evaluated to determine whether it is defective, the neighbor pixels that are horizontally adjacent or vertically adjacent to the given pixel $A_{3,3}$ within the particular Bayer domain (e.g., the pixel $A_{1,3}$, the pixel $A_{3,1}$, the pixel $A_{3,5}$, and the pixel $A_{5,3}$) can be adjusted based upon the exposure ratio as described herein (e.g., when the first exposure time differs from the second exposure time). Further, the neighbor pixels that are diagonally adjacent to the given pixel $A_{3,3}$ within the particular Bayer domain (e.g., the pixel $A_{1,1}$, the pixel $A_{1,5}$, the pixel $A_{5,1}$, and the pixel $A_{5,5}$) need not be adjusted. After such adjustment of the values of the horizontally adjacent or vertically adjacent neighbor pixels, the neighborhood statistics can be evaluated as described herein.

Figure 7:
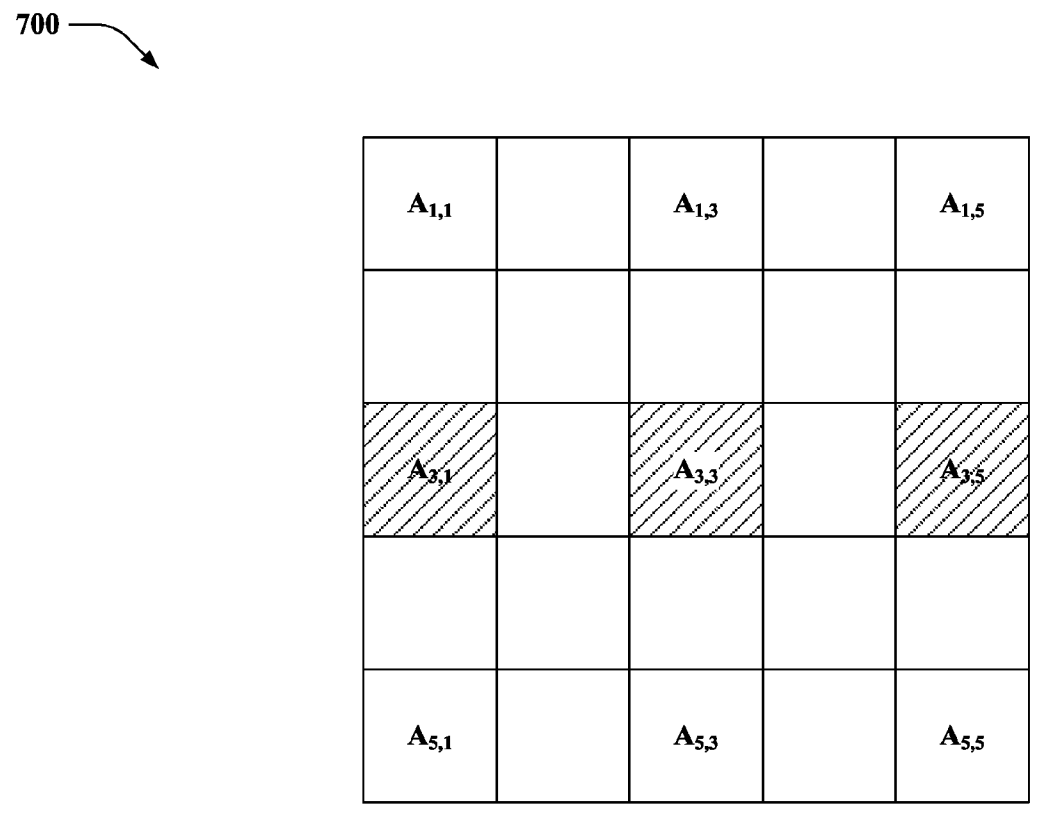

Referring to FIG. 7, illustrated is a portion 700 of a pixel array that includes a given pixel and a neighborhood of the given pixel, where subsets of the pixels are spatially arranged according to the exemplary pattern of FIG. 4. Similar to the discussion above pertaining to FIGS. 5-6, the given pixel $A_{3,3}$ can be evaluated to determine whether it is a defective pixel and the neighborhood for the given pixel $A_{3,3}$ can be formed. Again, the neighbor pixels of the given pixel $A_{3,3}$ include the pixel $A_{1,1}$, the pixel $A_{1,3}$, the pixel $A_{1,5}$, the pixel $A_{3,1}$, the pixel $A_{3,5}$, the pixel $A_{5,1}$, the pixel $A_{5,3}$, and the pixel $A_{5,5}$. Further, the pre-neighborhood of the given pixel $A_{3,3}$ includes the pixel $A_{1,1}$, the pixel $A_{1,3}$, the pixel $A_{1,5}$, and the pixel $A_{3,1}$, and the post-neighborhood of the given pixel $A_{3,3}$ includes the pixel $A_{3,5}$, the pixel $A_{5,1}$, the pixel $A_{5,3}$, and the pixel $A_{5,5}$.

Pursuant to the example shown in FIG. 7, the given pixel $A_{3,3}$ as well as the neighbor pixels that are horizontally adjacent to the given pixel $A_{3,3}$ within the particular Bayer domain are included in the first subset of the pixels of the pixel array having the first exposure time. Thus, the given pixel $A_{3,3}$ as well as the pixel $A_{3,1}$ and the pixel $A_{3,5}$ are each exposed for the first exposure time. Moreover, the neighbor pixels that are vertically adjacent or diagonally adjacent to the given pixel $A_{3,3}$ are included in the second subset of the pixels of the pixel array having the second exposure time. Accordingly, the pixel $A_{1,1}$, the pixel $A_{1,3}$, the pixel $A_{1,5}$, the pixel $A_{5,1}$, the pixel $A_{5,3}$, and the pixel $A_{5,5}$ are each exposed for the second exposure time. Pursuant to another example (not shown), the given pixel $A_{3,3}$ as well as the neighbor pixels that are horizontally adjacent to the given pixel $A_{3,3}$ within the particular Bayer domain (e.g., the pixel $A_{3,1}$ and the pixel $A_{3,5}$) can be included in the second subset of the pixels of the pixel array having the second exposure time, and the neighbor pixels that are vertically adjacent or diagonally adjacent to the given pixel $A_{3,3}$ (e.g., the pixel $A_{1,1}$, the pixel $A_{1,3}$, the pixel $A_{1,5}$, the pixel $A_{5,1}$, the pixel $A_{5,3}$, and the pixel $A_{5,5}$) can be included in the first subset of the pixels of the pixel array having the first exposure time.

When the given pixel $A_{3,3}$ is evaluated to determine whether it is defective, the neighbor pixels that are vertically adjacent or diagonally adjacent to the given pixel $A_{3,3}$ within the particular Bayer domain (e.g., the pixel $A_{1,1}$, the pixel $A_{1,3}$, the pixel $A_{1,5}$, the pixel $A_{5,1}$, the pixel $A_{5,3}$, and the pixel $A_{5,5}$) can be adjusted based upon the exposure ratio as described herein (e.g., when the first exposure time differs from the second exposure time). Further, the neighbor pixels that are horizontally adjacent to the given pixel $A_{3,3}$ within the particular Bayer domain (e.g., the pixel $A_{3,1}$ and the pixel $A_{3,5}$) need not be adjusted. After such adjustment of the values of the vertically adjacent and diagonally adjacent pixels, the neighbor statistics can be evaluated as described herein.

Figure 8:
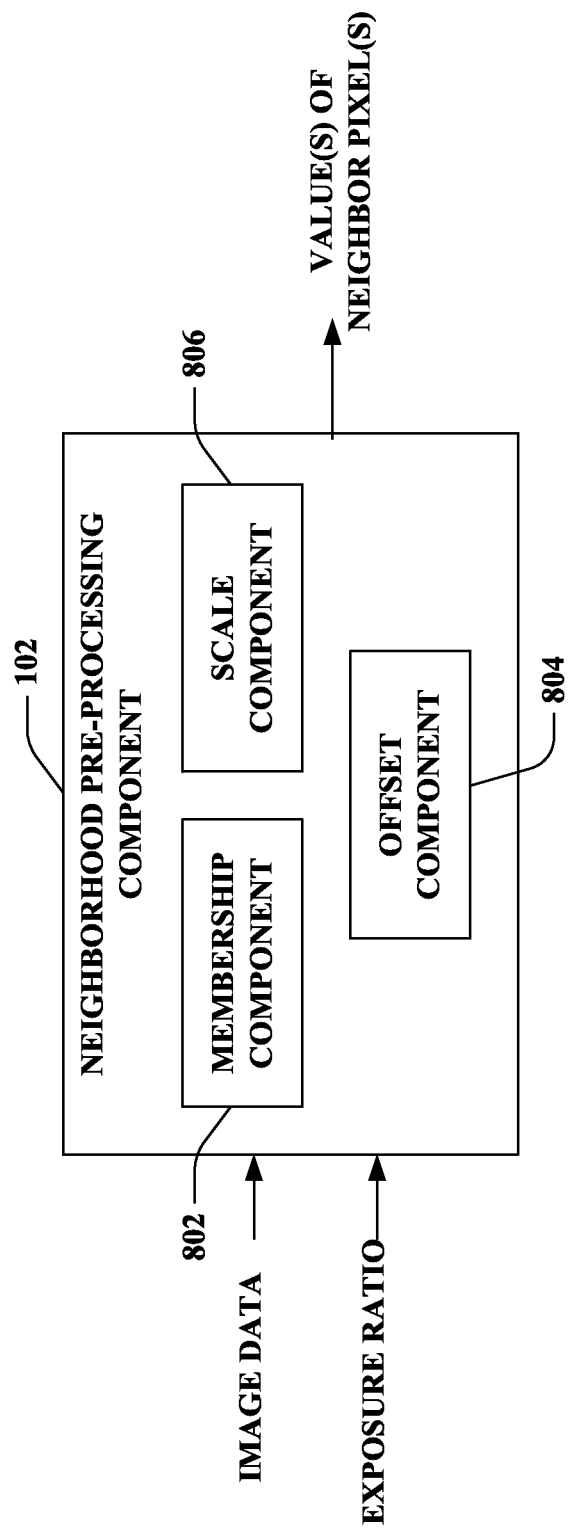
FIG. 8 illustrates a neighborhood pre-processing component included in the exemplary defect pixel correction system of FIG. 1 in greater detail.

Turning to FIG. 8, illustrated is the neighborhood pre-processing component 102 in greater detail. As described above, the neighborhood pre-processing component 102 can receive the exposure ratio for the pixel array and adjust the value of at least the particular neighbor pixel of the given pixel from the image data based upon the exposure ratio. The neighborhood pre-processing component 102 can adjust the value of the particular neighbor pixel within the particular Bayer domain if and only if the first exposure time differs from the second exposure time and the particular neighbor pixel is exposed for either the first exposure time or the second exposure time and the given pixel is exposed for the other one of the first exposure time or the second exposure time. According to an example where a checkerboard pattern is utilized for the spatial arrangement of the differing subsets of the pixels (as shown in FIGS. 3 and 6), the neighborhood pre-processing component 102 can adjust the value of the particular neighbor pixel if and only if the particular neighbor pixel is either vertically adjacent or horizontally adjacent to the given pixel within the particular Bayer domain and the first exposure time differs from the second exposure time. Pursuant to another example where a stripe pattern is utilized for the spatial arrangement of the differing subsets of the pixels (as shown in FIGS. 4 and 7), the neighborhood pre-processing component 102 can adjust the value of the particular neighbor pixel if and only if the particular neighbor pixel is either vertically adjacent or diagonally adjacent to the given pixel within the particular Bayer domain and the first exposure time differs from the second exposure time.

The neighborhood pre-processing component 102 further includes a membership component 802 that determines whether the given pixel is included in either the first subset of the pixels having the first exposure time or the second subset of the pixels having the second exposure time. For example (assuming the checkerboard pattern), the membership component 802 can employ the following algorithm to determine whether or not the given pixel is included in the same subset of pixels as a first pixel in the pixel array (e.g., the first pixel is positioned at a row 0 and a column 0 within the pixel array).

If row=j, column=i; for the given pixel, then:

```
if ((((j%4) == 0) || (((j - 1)%4) == 0)) && (((i%4) == 0) || (((i + 1)%4)
        == 0)))
{
    /* the given pixel is the same exposure as the first pixel */
}
else
{
    if (((((j - 2)%4) == 0) || (((j + 1)%4) == 0)) && (((i%4)
            > 0) && (((i + 1)%4) > 0)))
    {
        /* the given pixel is the same exposure as the first pixel */
    }
    else
    {
        /* the given pixel is NOT the same exposure as the first pixel */
    }
}
```

In the foregoing algorithm, j represents a row of the given pixel within the pixel array and i represents a column of the given pixel within the pixel array, where j and i are each greater than or equal to 0. Accordingly, the membership component 802 can employ the above algorithm to recognize whether the given pixel has the same exposure time as a first pixel in the pixel array or a different exposure time as compared to the first pixel in the pixel array. According to another example (assuming the stripe pattern), the membership component 802 can recognize whether the given pixel has a same exposure time as the first pixel in the pixel array or a different exposure time as compared to the first pixel in the pixel array as a function of the row of the given pixel. Further, based upon whether the first pixel has a long exposure time or a short exposure time, the membership component 802 can identify whether the given pixel has the long exposure time or the short exposure time.

Adjustment of the particular neighbor pixel is described below; yet, it is implied that other neighbor pixels that have the same exposure time as the particular neighbor pixel are similarly adjusted. The neighborhood pre-processing component 102 can further include an offset component 804 and a scale component 806. The offset component 804 can subtract a black level from the value of the particular neighbor pixel to compute a remaining value of the particular neighbor pixels. The black level is a sensor output offset of data (e.g., the image data) obtained by the neighborhood pre-processing component 102. The black level can be a preset value (e.g., selected from the range of 0 to a maximum possible pixel value).

Moreover, the scale component 806 can scale the remaining value of the particular neighbor pixel as a function of the exposure ratio to compute a scaled value of the particular neighbor pixel. The scale component 806 can perform such scaling by either multiplying or dividing the remaining value of the particular neighbor pixel by the exposure ratio based on whether the given pixel is included in the first subset of the pixels having the first exposure time or the second subset of the pixels having the second exposure time as determined by the membership component 802.

According to an example, the first exposure time can be greater than the second exposure time; thus, the exposure ratio can be greater than one. Following this example, the scale component 806 can scale the remaining value of the particular neighbor pixel as a function of the exposure ratio to compute the scaled value of the particular neighbor pixel by either multiplying the remaining value of the particular neighbor pixel by the exposure ratio when the given pixel is determined to be included in the first subset of the pixels having the first exposure time or, alternatively, dividing the remaining value of the particular neighbor pixel by the exposure ratio when the given pixel is determined to be included in the second subset of the pixels having the second exposure time.

According to another example, the second exposure time can be greater than the first exposure time; hence, the exposure ratio can be less than one. In accordance with this example, the scale component 806 can scale the remaining value of the particular neighbor pixel as a function of the exposure ratio to compute the scaled value of the particular neighbor pixel by either multiplying the remaining value of the particular neighbor pixel by the exposure ratio when the given pixel is determined to be included in the second subset of the pixels having the second exposure time or, alternatively, dividing the remaining value of the particular neighbor pixel by the exposure ratio when the given pixel is determined to be included in the first subset of the pixels having the first exposure time.

Moreover, the offset component 804 can add the black level to the scaled value of the particular neighbor pixel computed by the scale component 806 to output an adjusted value of the particular neighbor pixel. The offset component 804 can clip the adjusted value of the particular neighbor pixel, if applicable (e.g., the adjusted value be can be clipped to 4095 if found to exceed 12 bits, etc.); however, the claimed subject matter is not so limited. The adjusted value of the particular neighbor pixel (as well as other adjusted values of other neighbor pixels) can thereafter be employed as described herein (e.g., by the neighborhood analysis component 104, the defect detection component 106, the replacement component 108, the exception component 110, etc.). Hereafter, neighbor pixel values referred to below are intended to refer to the values derived after appropriate adjustment as described. The adjusted values are also used in calculating the relevant statistics e.g. the standard deviation and the central tendency measures.

Again, reference is made to FIG. 1. As noted above, the defect pixel correction system 100 can include the exception component 110 that detects whether a condition exists when the first exposure time differs from the second exposure time (e.g., when the image sensor operates in the wide dynamic range mode). The exception component 110 can further inhibit replacement of the value of the given pixel from the image data regardless whether detected to be defective. Assume that the first exposure time differs from the second exposure time; thus, it follows that either the first exposure time or the second exposure time is a long exposure time, while the other one is a short exposure time.

It is contemplated that various conditions can be detected by the exception component 110. Detection of at least one of such conditions can cause the exception component 110 to inhibit adjustment of the value of the particular neighbor pixel. Examples of conditions that can be detected by the exception component 110 are set forth below.

The exception component 110 can detect a condition where the neighbor pixels cover a high-frequency region. The neighbor pixels covering the high-frequency region can be detected by the exception component 110 when a standard deviation of the values of the neighbor pixels is greater than a product of a high-frequency multiplier times a central tendency measure of the values of the neighbor pixels. According to an example, the high-frequency multiplier can be selected from a range of 0 to 0.5. In accordance with an illustration, the high-frequency multiplier can be 0.15; yet, other values of the high-frequency multiplier are intended to fall within the scope of the hereto appended claims. This condition corresponds to a high number of edges within the local area of the given pixel.

The exception component 110 can also detect a condition where the given pixel has the long exposure time, the value of the given pixel is above a predefined saturation value, and the neighbor pixels cover a mid-to-high frequency region. The predefined saturation value can be selected from a range from 0 to a maximum possible pixel value. For instance, the predefined saturation value can be 3950 for 12-bit output; however, other values can be selected as the predefined saturation value. Further, the exception component 110 can detect that the neighbor pixels cover the mid-to-high frequency region when a standard deviation of the values of the neighbor pixels is greater than a first product of a middle-frequency multiplier times a central tendency measure of the values of the neighbor pixels, and less than or equal to a second product of the high-frequency multiplier times the central tendency measure of the values of the neighbor pixels. The middle-frequency multiplier, for example, can be selected from the range of 0 to 0.25. For instance, the middle-frequency multiplier can be 0.075; yet, the claimed subject matter is not so limited.

Further, the exception component 110 can detect a condition where the given pixel has the short exposure time and the value of the given pixel is less than a predefined dark threshold. The predefined dark threshold, for example, can be computed as a product of a dark threshold multiplier times the black level. For instance, the dark threshold multiplier can be selected from the range of 1 to 5. According to an illustration, the dark threshold multiplier can be 2; yet, the claimed subject matter is not so limited.

Moreover, the exception component 110 can detect a condition where the given pixel has the short exposure time and at least one of the neighbor pixels having the long exposure time has a value above the predefined saturation value.

As noted above, upon detecting one or more of the foregoing conditions, the exception component 110 can inhibit replacement of the value of the given pixel from the image data regardless whether detected to be defective.

Figure 9:
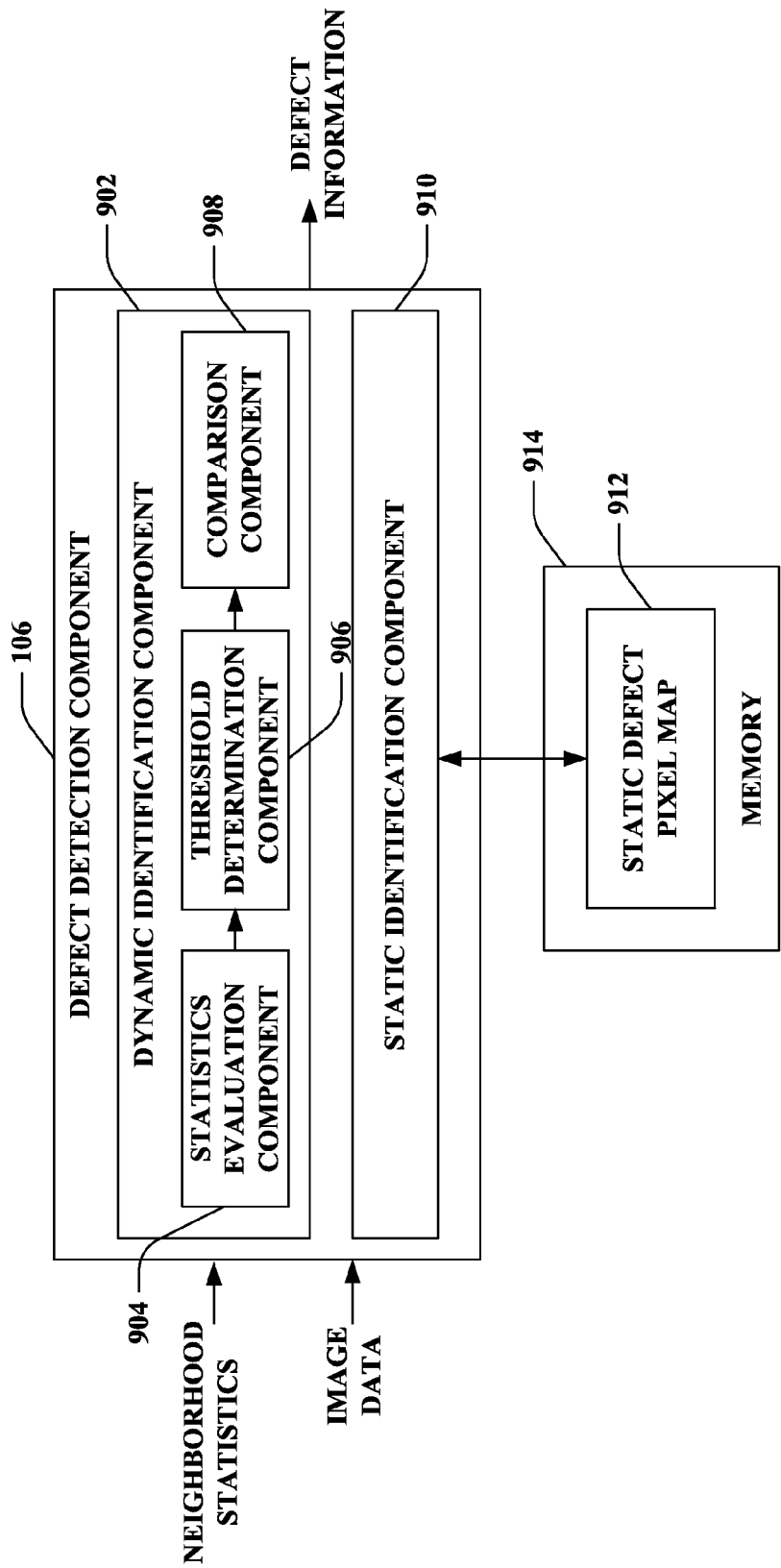
FIG. 9 illustrates a defect detection component included in the exemplary defect pixel correction system of FIG. 1 in greater detail.

With reference to FIG. 9, illustrated is the defect detection component 106 in greater detail. As noted above, the defect detection component 106 can detect whether the value of the given pixel from the image data is defective based upon the neighborhood statistics computed by the neighborhood analysis component 104. Further, as set forth above, the neighborhood analysis component 104 computes the neighborhood statistics for the given pixel from the image data based on the values of the neighbor pixels of the given pixel from the image data as adjusted by the neighborhood preprocessing component 102.

The defect detection component 106 includes a dynamic identification component 902 that can dynamically detect defects. The defect detection component 106 can further include a static identification component 910 that can statically detect defects; yet, the claimed subject matter is not so limited.

The dynamic identification component 902 includes a statistics evaluation component 904 that detects whether the neighbor pixels cover a flat region or a non-flat region based upon the neighborhood statistics. The statistics evaluation component 904 can detect that the neighbor pixels cover a flat region when the standard deviation of the values of the neighbor pixels is less than a predefined percentage of the central tendency measure of the values of the neighbor pixels. Further, the statistics evaluation component 904 can detect that the neighbor pixels cover a non-flat region when the standard deviation of the values of the neighbor pixels is greater than or equal to the predefined percentage of the central tendency measure of the values of the neighbor pixels. The predefined percentage can be selected from a range from 0 to 25%. For instance, the predefined percentage can be preset, adjusted responsive to an input (e.g., user selection, etc.), and so forth.

According to an example, the predefined percentage can be selected to be 3%. Thus, if the standard deviation divided by the central tendency measure of the values of the neighbor pixels is less than 3%, then the neighbor pixels can be considered to cover a flat region. Otherwise, if the standard deviation divided by the central tendency measure of the values of the neighbor pixels is greater than or equal to 3%, then the neighbor pixels can be considered to cover a non-flat region. It is to be appreciated, however, that other predefined percentages are intended to fall within the scope of the hereto appended claims, and the claimed subject matter is not limited to the predefined percentage being 3%.

A flat region is an area of an image having similar pixel values with lower variation between the pixel values as compared to a non-flat region. For instance, if an image includes a large white area, the standard deviation of pixel values in the white area may be low because such pixels may be saturated (e.g., the standard deviation may be lower than for an area that includes edges).

Moreover, the dynamic identification component 902 includes a threshold determination component 906 that selects a predefined parameter as a function of whether the neighbor pixels cover the flat region or the non-flat region. Moreover, the threshold determination component 906 computes a high threshold and a low threshold based upon the selected predefined parameter and the neighborhood statistics. The selected predefined parameter includes a first multiplier and a second multiplier when the neighbor pixels cover a flat region. Moreover, the predefined parameter includes a third multiplier and a fourth multiplier when the neighbor pixels cover a non-flat region.

The threshold determination component 906 can compute the high threshold as the central tendency measure plus a product of the standard deviation times the first multiplier when the neighbor pixels cover the flat region. Moreover, the threshold determination component 906 can compute the low threshold as the central tendency measure minus a product of the standard deviation times the second multiplier when the neighbor pixels cover the flat region. Thus, the first multiplier and the second multiplier can be utilized to determine just noticeable difference thresholds (e.g., the high threshold and the low threshold) when the standard deviation is identified as being very low in comparison to the central tendency measure of the neighbor pixels. The first multiplier and the second multiplier can each be selected from a range of 0 to 1. By way of illustration, the first multiplier can be 0.2 and the second multiplier can be 0.4. However, it is contemplated that any other values can be utilized for the first multiplier and/or the second multiplier.

Alternatively, the threshold determination component 906 can compute the high threshold as the central tendency measure plus a product of the standard deviation times the third multiplier when the neighbor pixels cover the non-flat region. Further, the threshold determination component 906 can compute the low threshold as the central tendency measure minus a product of the standard deviation times the fourth multiplier when the neighbor pixels cover the non-flat region. According to another example, the third multiplier and the fourth multiplier can each be selected from a range of 0 to 15. According to an example, the third multiplier can be 5 and the fourth multiplier can be 10. Yet, it is contemplated that substantially any other values of the third multiplier and/or the fourth multiplier can be utilized.

By way of illustration, the first multiplier, the second multiplier, the third multiplier, and/or the fourth multiplier can be predefined, adjusted based upon an input (e.g., user selection, etc.), and so forth. For instance, based on the user selection of the multiplier(s), the low threshold and the high threshold can be calculated by the threshold determination component 906. According to an example, the first multiplier can be less than the second multiplier, and the third multiplier can be less than the fourth multiplier. Thus, the dynamic identification component 902 can be more sensitive to hot pixels as compared to cold pixels. While it is contemplated that different multipliers can be utilized to determine the high threshold and the low threshold, according to other examples it is contemplated that the first multiplier can be equal to the second multiplier and/or the third multiplier can be equal to the fourth multiplier.

The dynamic identification component 902 further includes a comparison component 908 that compares the value of the given pixel to the high threshold and the low threshold computed by the threshold determination component 906. The value of the given pixel from the image data is detected to be defective when greater than the high threshold or less than the low threshold. If the comparison component 908 determines that the given pixel lies outside the low threshold or the high threshold, then the given pixel is deemed defective.

As noted above, the defect detection component 106 can further include the static identification component 910, which can check whether the given pixel is specified as being defective in a static defect pixel map 912. The static defect pixel map 912 can be retained in memory 914. The static identification component 910 checks the static defect pixel map 912 to evaluate whether the given pixel has been identified as defective.

Accordingly, defect information can be outputted by the dynamic identification component 902 and/or the static identification component 910. The defect information, for instance, can specify whether the given pixel is detected to be defective. Hence, regardless whether the given pixel is detected to be defective by the dynamic identification component 902 and/or the static identification component 910, the following logic for replacing the given pixel implemented by the replacement component 108 can be employed.

Figure 10:
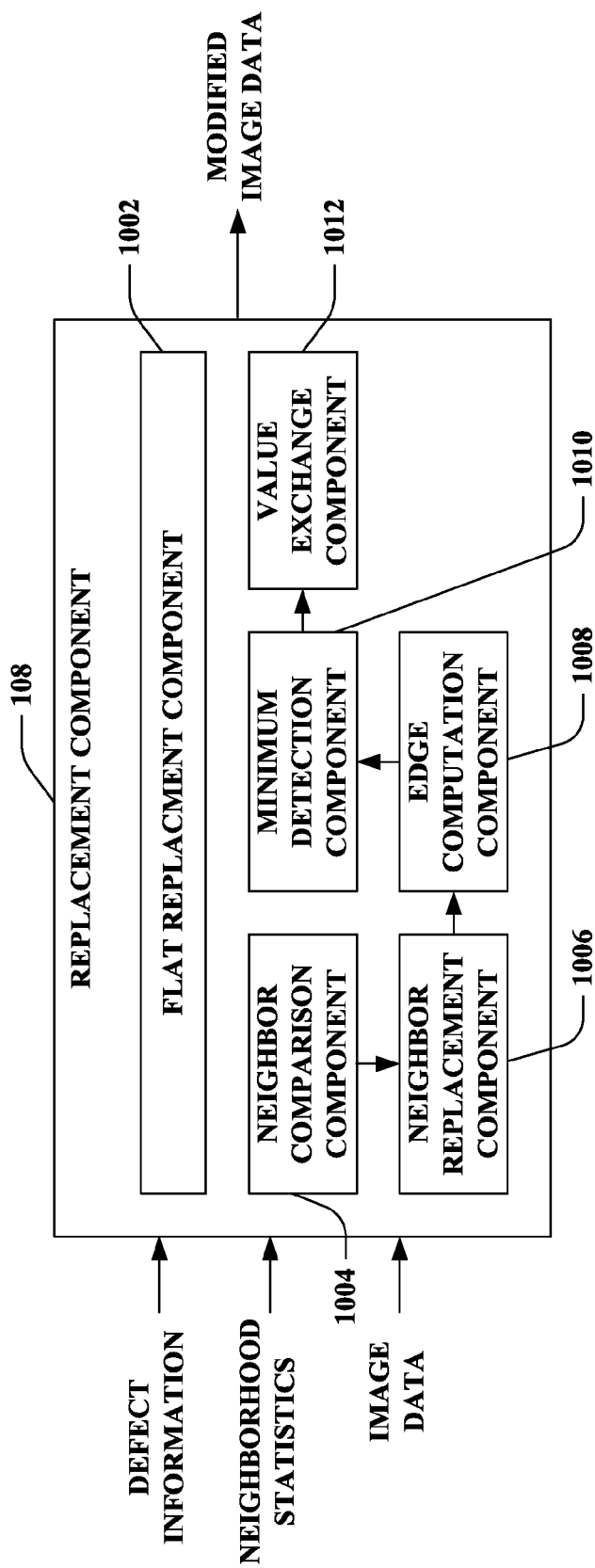
FIG. 10 illustrates a replacement component included in the exemplary defect pixel correction system of FIG. 1 in greater detail.

Turning to FIG. 10, illustrated is the replacement component 108 in greater detail. The replacement component 108 replaces the value of the given pixel from the image data when detected to be defective by the defect detection component 106 (e.g., as specified in the defect information received from the defect detection component 106). The replacement component 108 can output the modified image data.

The replacement component 108 includes a flat replacement component 1002 that replaces the value of the given pixel from the image data with the central tendency measure of the values of the neighbor pixels to output the modified image data when the neighbor pixels are detected to cover the flat region. Note again that the values of neighbor pixels referred to here are the values derived after suitable adjustment by the neighborhood pre-processing component 102 of FIG. 1. According to an example, when the standard deviation is found to be low as compared to the central tendency measure of the values of the neighbor pixels, then the given pixel is compared to the just noticeable difference high and low thresholds (e.g., based upon the first multiplier and the second multiplier). Following this example, the flat replacement component 1002 can replace the value of the given pixel with the central tendency measure of the values of the neighbor pixels (e.g., the median or the mean) when the value of the given pixel is determined to be defective (e.g., greater than the just noticeable difference high threshold or less than the just noticeable difference low threshold).

Moreover, the replacement component 108 can include a neighbor comparison component 1004 that respectively compares a subset of the values of the neighbor pixels to the high threshold and the low threshold (e.g., to determine whether one or more of the values of the neighbor pixels from the subset are defective). The subset of the values of the neighbor pixels are for neighbor pixels that have yet to be processed (e.g., the post-neighborhood of the given pixel). Moreover, a remainder of the values of the neighbor pixels not included in the subset are for neighbor pixels that have previously been processed (or are boundary pixels). Thus, the pixels in the post-neighborhood are evaluated against the high threshold and the low threshold by the neighbor comparison component 1004, whereas the pixels in the pre-neighborhood need not be evaluated by the neighbor comparison component 1004.

The replacement component 108 further includes a neighbor replacement component 1006 that replaces, with a predefined temporary value, the values of the neighbor pixels from the subset that are respectively determined to be greater than the high threshold or less than the low threshold by the neighbor comparison component 1004. According to an example, the predefined temporary value can be zero; yet, it is contemplated that other predefined temporary values are intended to fall within the scope of the hereto appended claims. Thus, a pixel in the post-neighborhood identified to be defective (e.g., having a value greater than the high threshold or less than the low threshold) has its value replaced with the predefined temporary value by the neighbor replacement component 1006 for subsequent calculations. Such replacement of the value(s) of the neighbor pixel(s) in the subset determined by the neighbor comparison component 1004 can be effectuated to account for two-pixel clusters. Such replacement may be effective when small values of the third multiplier and the fourth multiplier are employed; yet, the claimed subject matter is not so limited.

The replacement component 108 further includes an edge computation component 1008 that computes magnitudes of a plurality of edges across the given pixel subsequent to replacement of the values of the neighbor pixels from the subset that are respectively determined to be greater than the high threshold or less than the low threshold. The edge computation component 1008 can compute a particular magnitude of a particular edge across the given pixel as an absolute value of a difference between the values of the neighbor pixels that belong to the particular edge. Note again that the values of neighbor pixels referred to here are the values derived after suitable adjustment by the neighborhood pre-processing component 102 of FIG. 1.

Moreover, the replacement component 108 includes a minimum detection component 1010 that identifies a minimum edge having a minimum magnitude from the magnitudes of the plurality of the edges. The replacement component 108 further includes a value exchange component 1012 that replaces the value of the given pixel from the image data with an average of the values of the neighbor pixels that belong to the minimum edge to output the modified image data.

According to an illustration, when the given pixel from the image data is detected to be defective by the defect detection component 106 and the neighbor pixels are detected to cover the flat region, the flat replacement component 1002 can replace the value of the given pixel from the image data with the central tendency measure of the values of the neighbor pixels to output the modified image data. Alternatively, when the given pixel from the image data is detected to be defective by the defect detection component 106 and the neighbor pixels are detected to cover the non-flat region, the neighbor comparison component 1004, the neighbor replacement component 1006, the edge computation component 1008, the minimum detection component 1010, and the value exchange component 1012 can be employed. More particularly, when the foregoing components are employed, the value of the given pixel from the image data can be replaced by the value exchange component 1012 with the average of the values of the neighbor pixels that belong to the minimum edge to output the modified image data.

By way of illustration and referring to the example set forth in FIG. 5 or FIGS. 6-7 (after adjustment based upon the exposure ratio), if the pixel $A_{3,3}$ is determined to be defective, then the edge computation component 1008 can compute magnitudes of a horizontal edge, a vertical edge, a left diagonal edge, and a right diagonal edge across the given pixel $A_{3,3}$. For example, a horizontal edge magnitude (H_edge), a vertical edge magnitude (V_edge), a left diagonal edge magnitude (LD_edge), and a right diagonal edge (RD_edge) can be calculated by the edge computation component 1008 as follows:

$$H\_edge=|A_{3,1}-A_{3,5}|$$

$$V\_edge=|A_{1,3}-A_{5,3}|$$

$$LD\_edge=|A_{1,1}-A_{5,5}|$$

$$RD\_edge=|A_{1,5}-A_{5,1}|$$

If one of the post-neighborhood pixels is determined to be defective by the neighbor comparison component 1004 and is replaced by the neighbor replacement component 1006 with the predefined temporary value, then the corresponding edge will have an increased magnitude. Moreover, the minimum detection component 1010 can identify the minimum of the four magnitudes of the four edges, and pixels belonging to such minimum edge can be averaged by the value exchange component 1012 to generate the replacement value for the defective pixel $A_{3,3}$.

Figure 11:
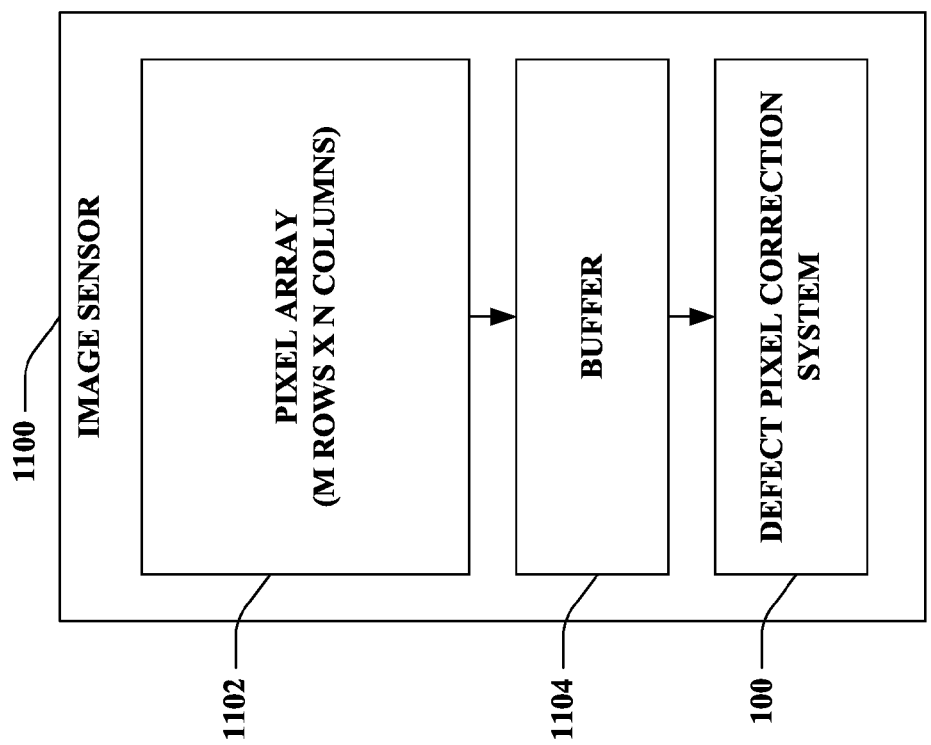
FIG. 11 illustrates an exemplary image sensor.

With reference to FIG. 11, illustrated is an exemplary image sensor 1100. The image sensor 1100 can be a CMOS image sensor system on chip. The image sensor 1100 includes a pixel array 1102, a buffer 1104, and the defect pixel correction system 100 as described herein. Thus, the defect pixel correction system 100 can be part of the image sensor 1100, which can be a Bayer pattern color image sensor. Further, the defect pixel correction system 100 can automatically correct defective pixels of the pixel array 1102. According to an example, a digital camera, a video camera (e.g., videoconference camera, broadcast video camera, cinematography camera, surveillance video camera, handheld video camera, camera integrated into a mobile phone, etc.), a video system, a medical imaging device (e.g., video laryngoscope, etc.), an industrial imaging device, a microscope, or the like can include the image sensor 1100.

The pixel array 1102 can include M rows and N columns of pixels, where M and N can be any integers. Each pixel in the pixel array 1102 can comprise a photodetector (e.g., photogate, photoconductor, photodiode, etc.) that overlays a substrate to generate a photo-generated charge. Each pixel can also include a source follower transistor and a floating diffusion region connected to a gate of the source follower transistor. Accordingly, charge generated by the photodetector can be sent to the floating diffusion region. Further, each pixel can include a transistor for transferring charge from the photodetector to the floating diffusion region and another transistor for resetting the floating diffusion region to a predetermined charge level prior to charge transference; yet, it is to be appreciated that the claimed subject matter is not so limited.

Output from a pixel included in a particular column of the pixel array 1102 can be provided to a voltage amplifier (not shown) corresponding to the particular column. The voltage amplifier can amplify analog video information (e.g., a signal) read out from the pixel in the particular column as well as other pixels in the particular column. Analog video information yielded from each pixel is oftentimes memorized into a sampling capacitor (not shown) at an output of the voltage amplifier corresponding to the column.

Output from the pixel array 1102 can be provided to the buffer 1104. The buffer 1104 can include five line buffers, for example. Following this example, the buffer 1104 can include five lines of memory utilized for correcting a defective pixel. Thus, the buffer 1104 can retain image data corresponding to five rows of the pixel array 1102. Moreover, the defect pixel correction system 100 can obtain the image data from the buffer 1104 and process the pixels as described herein.

Figure 12:
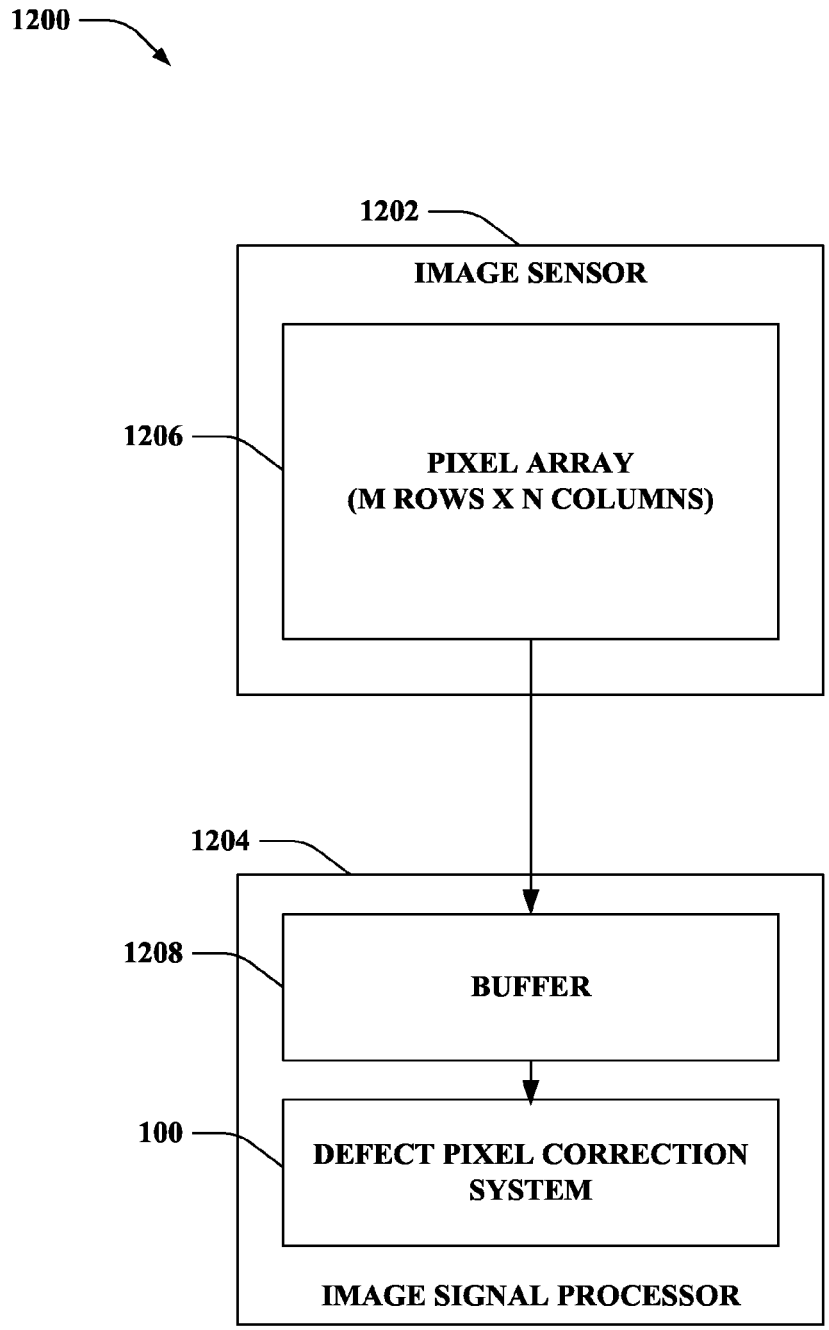
FIG. 12 illustrates an exemplary imaging system that includes an image sensor and an image signal processor.

Now turning to FIG. 12, illustrated is an imaging system 1200 that includes an image sensor 1202 and an image signal processor 1204. The image sensor 1202 includes a pixel array 1206, which can be substantially similar to the pixel array 1102 of FIG. 11. Moreover, the image signal processor 1204 includes a buffer 1208, which can be substantially similar to the buffer 1104 of FIG. 11. Further, the image signal processor 1204 includes the defect pixel correction system 100. Thus, pursuant to the example shown in FIG. 12, the defect pixel correction system 100 can be realized in hardware to be implemented as part of the image signal processor 1204.

While FIGS. 11-12 illustrate the defect pixel correction system 100 being incorporated as part of an image sensor or an image signal processor, it is contemplated that other off-line image processing pipes can include the defect pixel correction system 100.

Figure 13:
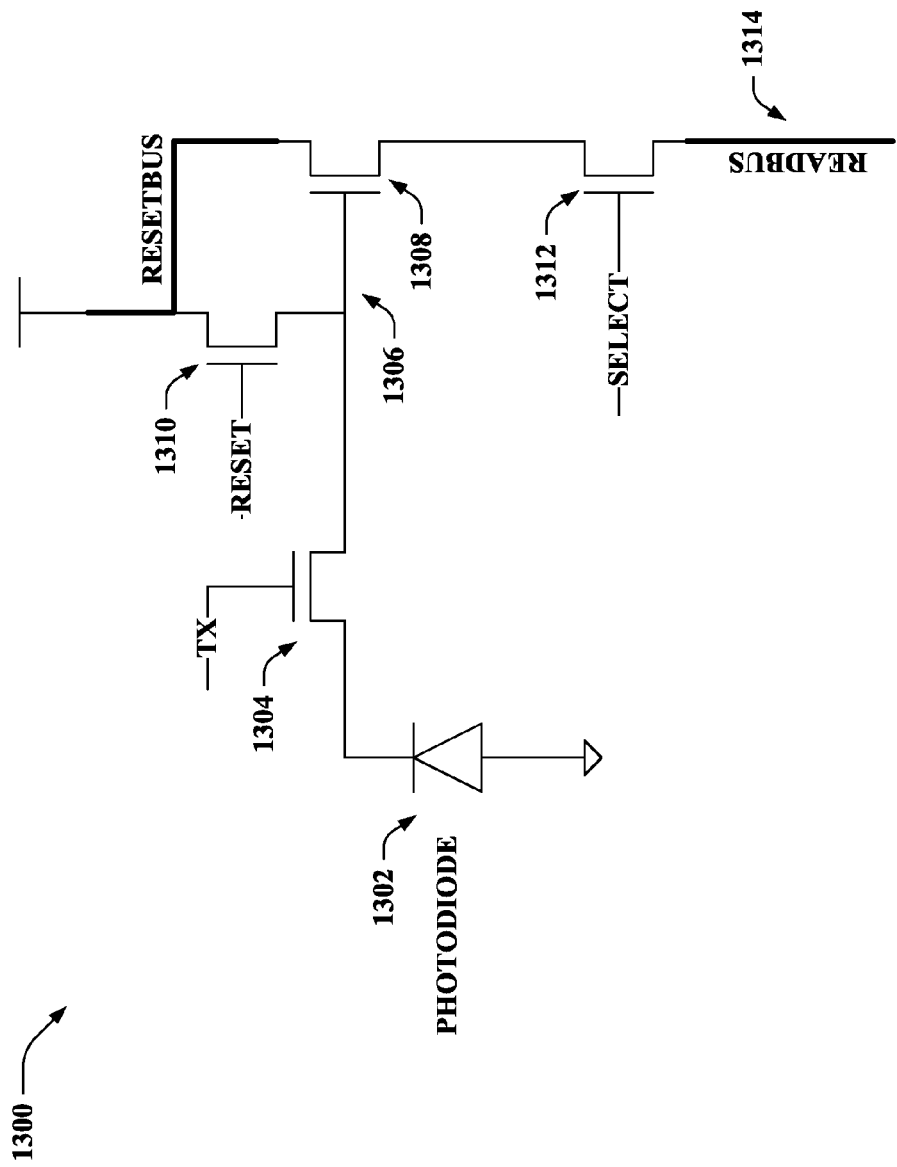
FIG. 13 illustrates a schematic diagram of an exemplary CMOS image sensor pixel that can be included in a pixel array.

Now turning to FIG. 13, illustrated is an exemplary CMOS image sensor pixel cell 1300 that can be included in a pixel array (e.g., the pixel array 1102 of FIG. 11, the pixel array 1206 of FIG. 12). The pixel 1300 as depicted is a 4 T pixel cell utilized in a CMOS image sensor system on chip. The pixel 1300 includes a photodiode 1302 connected to a transfer transistor 1304. The transfer transistor 1304 is further connected to a floating diffusion region 1306. The floating diffusion region 1306 connects to a source follower transistor 1308 and a reset transistor 1310. The source follower transistor 1308 is further connected to a select transistor 1312. The select transistor 1312 can be employed to select a particular row of pixel cells from a pixel array. For instance, a select signal can be received at a gate of the select transistor 1312 to read out a value from the floating diffusion region 1306.

The photodiode 1302 can be charged by converting optical energy to electrical energy. For instance, the photodiode 1302 can have sensitivity to a particular type of incident light (e.g., red light, blue light, green light). Yet, it is to be appreciated that the claimed subject matter is not so limited.

According to an illustration, the floating diffusion region 1306 can be reset to a known state before transfer of charge to it. Resetting of the floating diffusion region 1306 can be effectuated by the reset transistor 1310. For example, a reset signal can be received at a gate of the reset transistor 1310 to cause resetting of the floating diffusion region 1306. Further, the transfer transistor 1304 can transfer charge (e.g., provided by the photodiode 1302) to the floating diffusion region 1306. The charge can be transferred based upon a transfer signal (TX) received at a gate of the transfer transistor 1304. Light can be integrated at the photodiode 1302 and electrons generated from the light can be transferred to the floating diffusion region 1306 (e.g., in a noiseless or substantially noiseless manner) when the TX is received at the transfer transistor 1304. Moreover, the pixel 1300 (along with other pixel(s) in the same row of the pixel array) can be selected for readout by employing the select transistor 1312. Readout can be effectuated via a read bus 1314. Further, the source follower transistor 1308 can output and/or amplify a signal representing a reset voltage (e.g., provided via a reset bus) and a pixel signal voltage based on the photo converted charges.

It is to be appreciated, however, that different pixel configurations other than the example illustrated in FIG. 13 are intended to fall within the scope of the hereto appended claims. For instance, a disparate pixel configuration can lack the transfer gate transistor 1304 (e.g., a 3T pixel). According to another illustration, a differing pixel configuration can include more than four transistors. Yet, it is to be appreciated that the claimed subject matter is not limited to the aforementioned examples.

Figure 14:
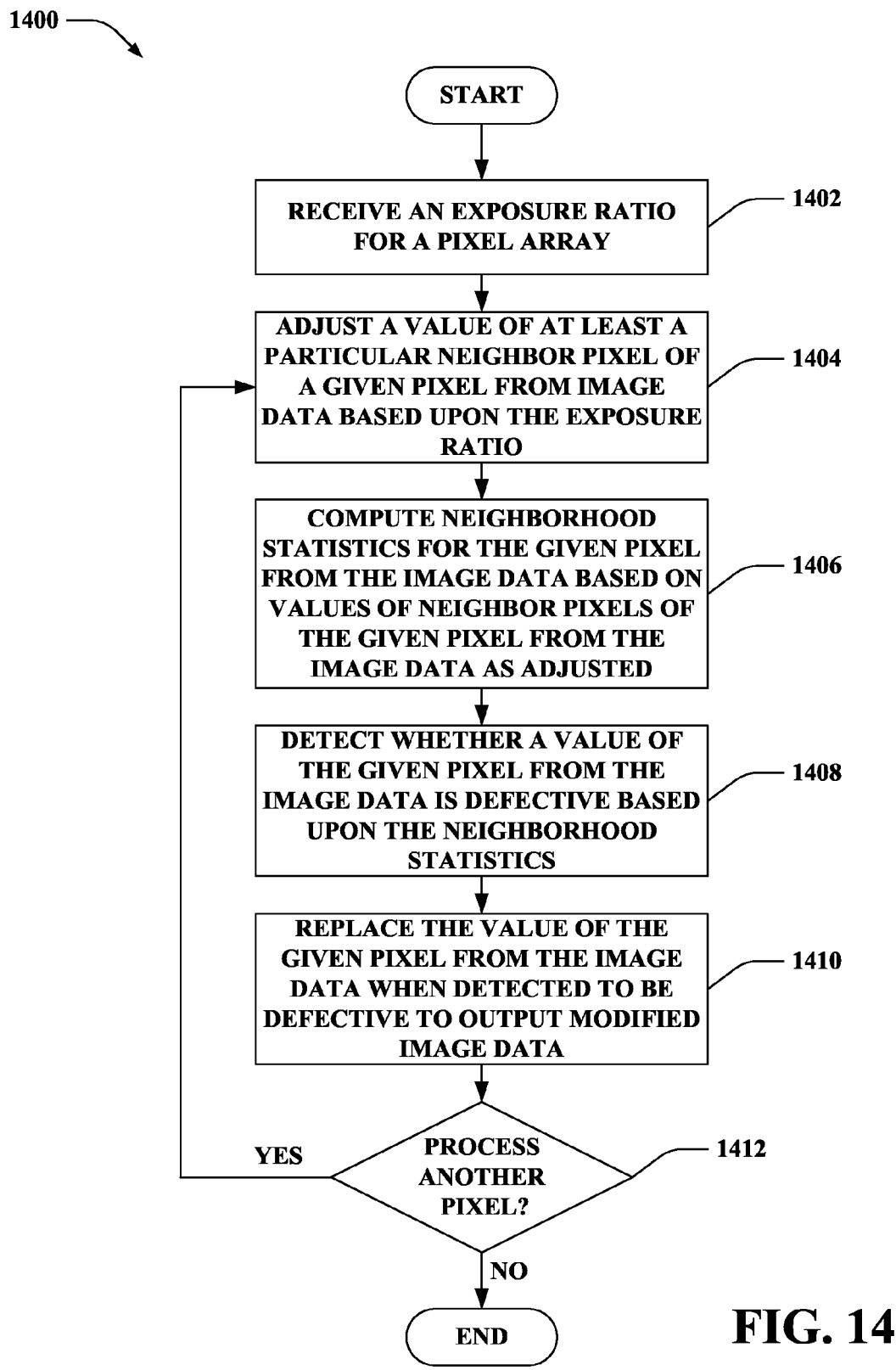
FIG. 14 is a flow diagram that illustrates an exemplary methodology of correcting defect pixels in image data collected by a pixel array of an image sensor with spatially arranged exposures.
Figure 15:
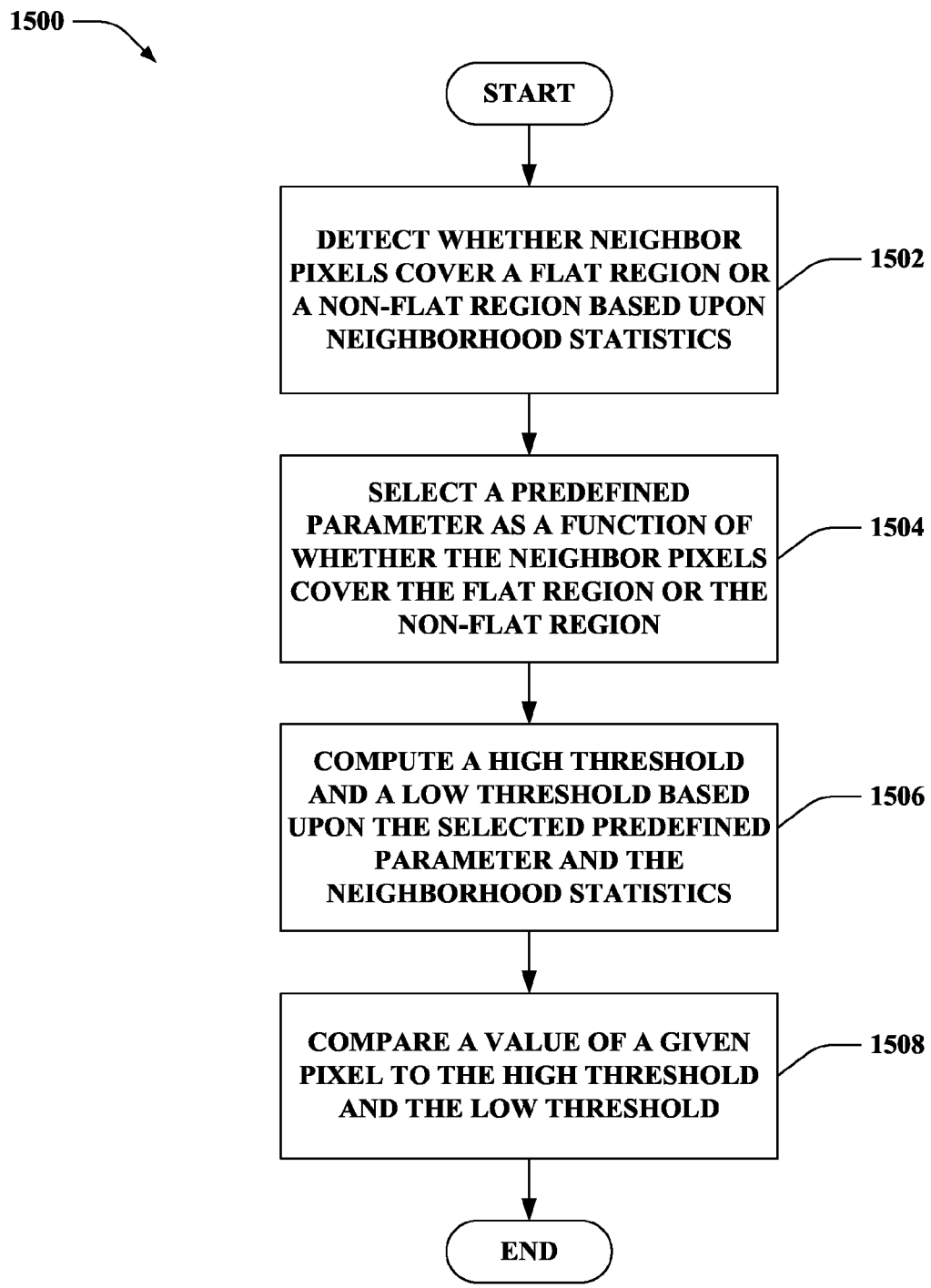
FIG. 15 is a flow diagram that illustrates an exemplary methodology of dynamically detecting whether a value of a given pixel from the image data is defective.
Figure 16:
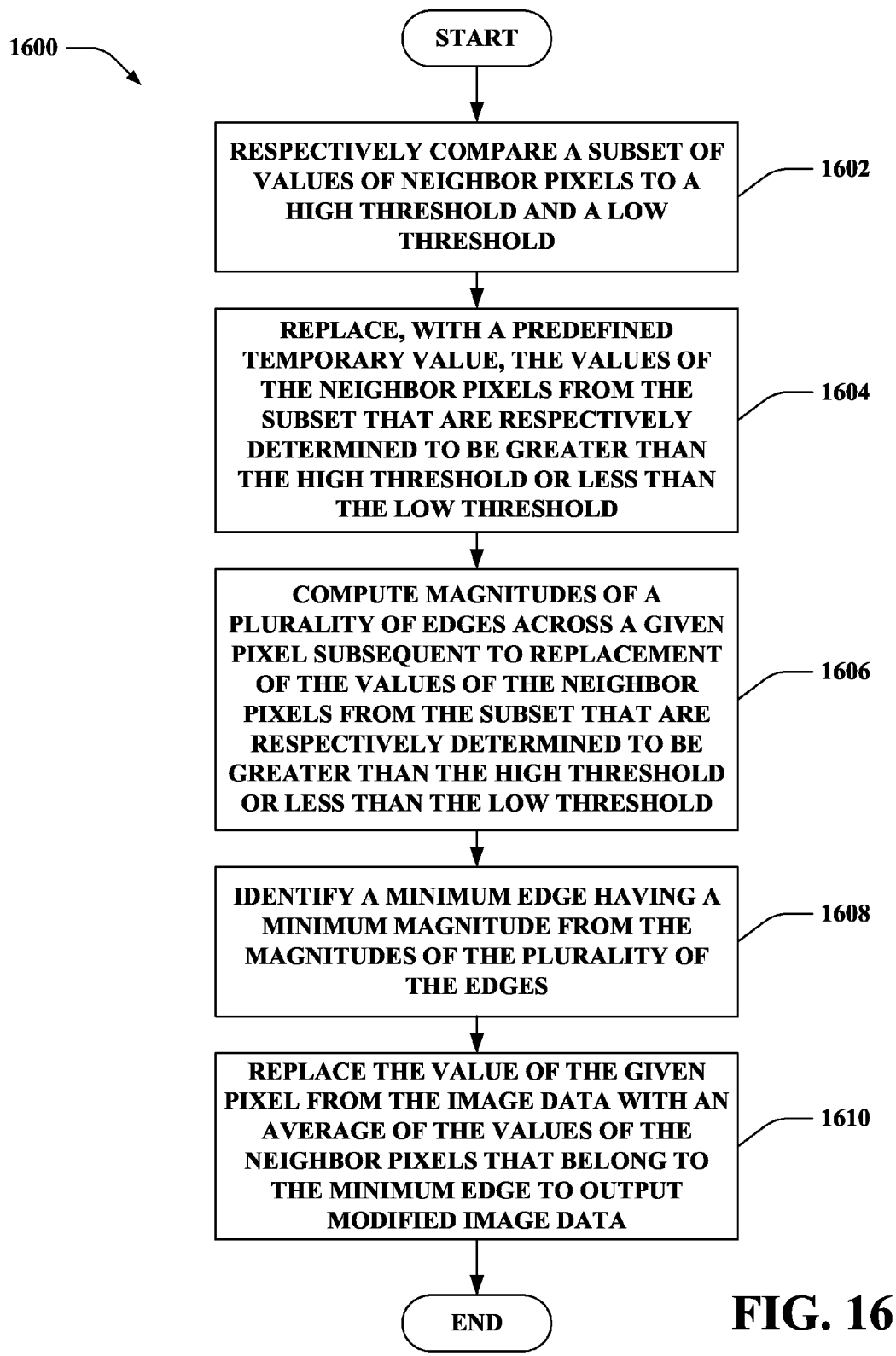
FIG. 16 is a flow diagram that illustrates an exemplary methodology of replacing the value of the given pixel from the image data when detected to be defective to output modified image data when neighbor pixels are detected to cover a non-flat region.

FIGS. 14-16 illustrate exemplary methodologies relating to defect pixel detection and correction. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

The acts described herein may be implemented by an image sensor or an image signal processor. Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

FIG. 14 illustrates a methodology 1400 of correcting defect pixels in image data collected by a pixel array of an image sensor with spatially arranged exposures. At 1402, an exposure ratio for a pixel array can be received. The exposure ratio is a ratio of a first exposure time of a first subset of pixels of the pixel array to a second exposure time of a second subset of the pixels of the pixel array.

At 1404, a value of at least a particular neighbor pixel of a given pixel from the image data can be adjusted based upon the exposure ratio. Neighbor pixels of the given pixel include the particular neighbor pixel. For example, the neighbor pixels and the given pixel can belong to a particular Bayer domain. Following this example, each of the neighbor pixels of the given pixel can be one of vertically adjacent, horizontally adjacent, or diagonally adjacent to the given pixel within the particular Bayer domain. According to other examples, it is contemplated that the image sensor with the spatially arranged exposures can include a color filter array that has a pattern other than the Bayer pattern; hence, the neighbor pixels of the given pixel can be dependent upon the pattern of the color filter array.

At 1406, neighborhood statistics for the given pixel can be computed from the image data based on values of neighbor pixels of the given pixel from the image data as adjusted. At 1408, whether the value of the given pixel from the image data is defective can be detected based upon the neighborhood statistics. At 1410, the value of the given pixel from the image data can be replaced when detected to be defective to output modified image data.

According to an example, when the first exposure time differs from the second exposure time, whether a condition exists can be detected. Following this example, upon detection of the existence of the condition, replacement of the value of the given pixel from the image data at 1410 can be inhibited regardless whether detected to be defective. However, it is to be appreciated that the claimed subject matter is not limited to the foregoing example.

At 1412, it can be determined whether to process another pixel from the pixel array. For example, the pixels of the pixel array can be processed across a first row, then across a second row, etc. through the pixel array. If there is another pixel to be processed, then the methodology 1400 can return to 1404 to process a next pixel. Alternatively, if the pixels from the pixel array have been processed (e.g., there is not another pixel to be processed), then the methodology 1400 can end.

Whether the value of the given pixel from the image data is defective can be determined statically and/or dynamically. For instance, static identification can include checking whether the given pixel is specified as being defective in a static defect pixel map. Dynamic detection is further described below in FIG. 15.

FIG. 15 illustrates a methodology 1500 of dynamically detecting whether the value of the given pixel from the image data is defective. At 1502, whether the neighbor pixels cover a flat region or a non-flat region can be detected based upon the neighborhood statistics. At 1504, a predefined parameter can be selected as a function of whether the neighbor pixels cover the flat region or the non-flat region. At 1506, a high threshold and a low threshold can be computed based upon the selected predefined parameter and the neighborhood statistics. At 1508, the value of a given pixel can be compared to the high threshold and the low threshold.

According to an example, when the neighbor pixels are detected to cover the flat region and the value of the given pixel from the image data is determined to be greater than the high threshold or less than the low threshold, then the value of the given pixel from the image data can be replaced with a central tendency measure of the values of the neighbor pixels to output modified image data. Alternatively, when the neighbor pixels are detected to cover the non-flat region and the value of the given pixel from the image data is determined to be greater than the high threshold or less than the low threshold, then replacement of the value of the given pixel can be effectuated as described below in FIG. 16. Replacement of the value of the given pixel can also be effectuated as described below in FIG. 16 when the given pixel is specified as being defective in a static defect pixel map.

With reference to FIG. 16, illustrated is a methodology 1600 of replacing the value of the given pixel from the image data when detected to be defective to output the modified image data when the neighbor pixels are detected to cover the non-flat region. At 1602, a subset of values of the neighbor pixels can be respectively compared to the high threshold and the low threshold (e.g., computed at 1506 in FIG. 15). At 1604, the values of the neighbor pixels from the subset that are respectively determined to be greater than the high threshold or less than the low threshold can be replaced with a predefined temporary value. At 1606, magnitudes of a plurality of edges across the given pixel can be computed subsequent to replacement of the values of the neighbor pixels from the subset that are respectively determined to be greater than the high threshold or less than the low threshold. At 1608, a minimum edge having a minimum magnitude from the magnitudes of the plurality of the edges can be identified. At 1610, the value of the given pixel from the image data can be replaced with an average of the values of the neighbor pixels that belong to the minimum edge to output the modified image data.

Figure 17:
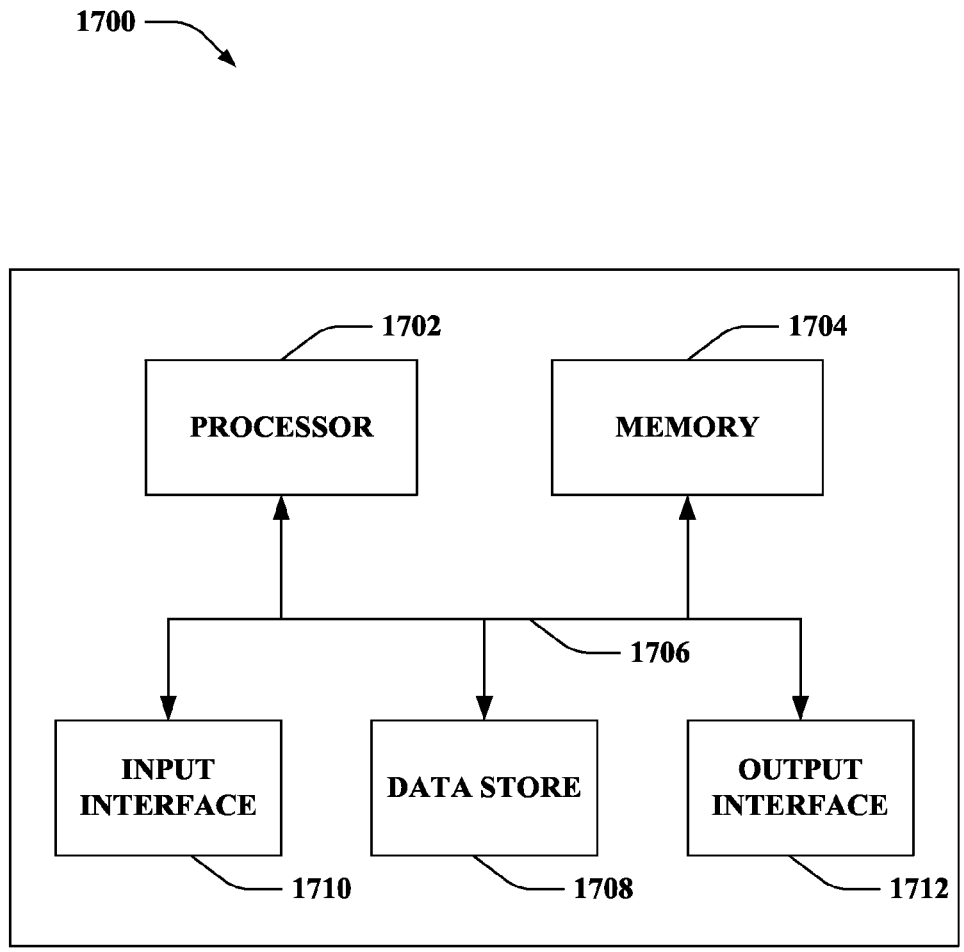
FIG. 17 illustrates an exemplary computing device.

Referring now to FIG. 17, a high-level illustration of an exemplary computing device 1700 that can be used in accordance with the systems and methodologies disclosed herein is illustrated. For instance, the computing device 1700 may employ a CMOS image sensor system on chip. According to another, one or more components of the computing device 1700 can be integrated in a CMOS image sensor system on chip. The computing device 1700 includes at least one processor 1702 that executes instructions that are stored in a memory 1704. The processor 1702 may access the memory 1704 by way of a system bus 1706.

The computing device 1700 additionally includes a data store 1708 that is accessible by the processor 1702 by way of the system bus 1706. The data store 1708 may include executable instructions, etc. The computing device 1700 also includes an input interface 1710 that allows external devices to communicate with the computing device 1700. For instance, the input interface 1710 may be used to receive instructions from an external computer device, from a user, etc. The computing device 1700 also includes an output interface 1712 that interfaces the computing device 1700 with one or more external devices. For example, the computing device 1700 may display text, images, etc. by way of the output interface 1712.

Additionally, while illustrated as a single system, it is to be understood that the computing device 1700 may be a distributed system. Thus, for instance, several devices may be in communication by way of a network connection and may collectively perform tasks described as being performed by the computing device 1700.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A defect pixel correction system for image data collected by a pixel array of an image sensor with spatially arranged exposures, comprising:
    a neighborhood pre-processing component that receives an exposure ratio for the pixel array and adjusts a value of at least a particular neighbor pixel of a given pixel from the image data based upon the exposure ratio, wherein the exposure ratio is a ratio of a first exposure time of a first subset of pixels of the pixel array to a second exposure time of a second subset of the pixels of the pixel array, wherein neighbor pixels of the given pixel comprise the particular neighbor pixel, wherein the neighbor pixels and the given pixel belong to a particular Bayer domain, wherein each of the neighbor pixels of the given pixel is one of vertically, horizontally, or diagonally adjacent to the given pixel within the particular Bayer domain, and wherein the neighborhood pre-processing component adjusts the value of the particular neighbor pixel within the particular Bayer domain if and only if:
        the first exposure time differs from the second exposure time; and
        the particular neighbor pixel is exposed for one of the first exposure time or the second exposure time and the given pixel is exposed for the other one of the first exposure time or the second exposure time;
    a neighborhood analysis component that computes neighborhood statistics for the given pixel from the image data based on values of the neighbor pixels of the given pixel from the image data as adjusted by the neighborhood pre-processing component;
    a defect detection component that detects whether a value of the given pixel from the image data is defective based upon the neighborhood statistics; and
    a replacement component that replaces the value of the given pixel from the image data when detected to be defective to output modified image data.

2. The defect pixel correction system of claim 1, wherein the neighborhood pre-processing component further comprises a membership component that determines whether the given pixel is comprised in one of the first subset of the pixels having the first exposure time or the second subset of the pixels having the second exposure time.

3. The defect pixel correction system of claim 2, wherein the neighborhood pre-processing component further comprises:
    an offset component that subtracts a black level from the value of the particular neighbor pixel to compute a remaining value of the particular neighbor pixel; and
    a scale component that scales the remaining value of the particular neighbor pixel as a function of the exposure ratio to compute a scaled value of the particular neighbor pixel;
    wherein the offset component adds the black level to the scaled value of the particular neighbor pixel to output an adjusted value of the particular neighbor pixel.

4. The defect pixel correction system of claim 3, wherein the scale component scales the remaining value of the particular neighbor pixel as a function of the exposure ratio to compute the scaled value of the particular neighbor pixel by one of:
    multiplying the remaining value of the particular neighbor pixel by the exposure ratio when the given pixel is determined to be comprised in the first subset of the pixels having the first exposure time, wherein the first exposure time is greater than the second exposure time; or
    dividing the remaining value of the particular neighbor pixel by the exposure ratio when the given pixel is determined to be comprised in the second subset of the pixels having the second exposure time, wherein the first exposure time is greater than the second exposure time.

5. The defect pixel correction system of claim 1, further comprising:
    an exception component that detects whether a condition exists when the first exposure time differs from the second exposure time, wherein the exception component, upon detection of the existence of the condition, inhibits replacement of the value of the given pixel from the image data regardless whether detected to be defective;
    wherein one of the first exposure time or the second exposure time is a long exposure time and the other one of the first exposure time or the second exposure time is a short exposure time.

6. The defect pixel correction system of claim 5, wherein the condition comprises the neighbor pixels cover a high frequency region, wherein the exception component detects that the neighbor pixels cover the high frequency region when a standard deviation of the values of the neighbor pixels is greater than a product of a high frequency multiplier times a central tendency measure of the values of the neighbor pixels.

7. The defect pixel correction system of claim 5, wherein the condition comprises:
    the given pixel has the long exposure time;
    the value of the given pixel is above a predefined saturation value; and
    the neighbor pixels cover a mid-to-high frequency region, wherein the exception component detects that the neighbor pixels cover the mid-to-high frequency region when a standard deviation of the values of the neighbor pixels is:
        greater than a first product of a middle frequency multiplier times a central tendency measure of the values of the neighbor pixels; and
        less than or equal to a second product of a high frequency multiplier times the central tendency measure of the values of the neighbor pixels.

8. The defect pixel correction system of claim 5, wherein the condition comprises:
the given pixel has the short exposure time; and
the value of the given pixel is less than a predefined dark threshold.

9. The defect pixel correction system of claim 5, wherein the condition comprises:
the given pixel has the short exposure time; and
at least one of the neighbor pixels having the long exposure time has a value above a predefined saturation value.

10. The defect pixel correction system of claim 1, wherein the defect detection component further comprises:
a statistics evaluation component that detects whether the neighbor pixels cover a flat region or a non-flat region based upon the neighborhood statistics;
a threshold determination component that selects a predefined parameter as a function of whether the neighbor pixels cover the flat region or the non-flat region, wherein the threshold determination component computes a high threshold and a low threshold based upon the selected predefined parameter and the neighborhood statistics; and
a comparison component that compares the value of the given pixel to the high threshold and the low threshold, wherein the value of the given pixel from the image data is detected to be defective when greater than the high threshold or less than the low threshold.

11. The defect pixel correction system of claim 10, wherein the neighborhood statistics comprise a standard deviation of the values of the neighbor pixels and a central tendency measure of the values of the neighbor pixels, and wherein the central tendency measure of the values of the neighbor pixels is one of a mean of the values of the neighbor pixels or a median of the values of the neighbor pixels.

12. The defect pixel correction system of claim 11, wherein the statistics evaluation component detects that the neighbor pixels cover the flat region when the standard deviation of the values of the neighbor pixels is less than a predefined percentage of the central tendency measure of the values of the neighbor pixels, and detects that the neighbor pixels cover the non-flat region when the standard deviation of the values is greater than or equal to the predefined percentage of the central tendency measure of the values of the neighbor pixels.

13. The defect pixel correction system of claim 11, wherein the selected predefined parameter comprises a first multiplier and a second multiplier when the neighbor pixels cover the flat region, wherein the predefined parameter comprises a third multiplier and a fourth multiplier when the neighbor pixels cover a non-flat region, wherein the threshold determination component computes the high threshold as the central tendency measure plus a first product of the standard deviation times the first multiplier and the low threshold as the central tendency measure minus a second product of the standard deviation times the second multiplier when the neighbor pixels cover the flat region, and wherein the threshold determination component computes the high threshold as the central tendency measure plus a third product of the standard deviation times the third multiplier and the low threshold as the central tendency measure minus a fourth product of the standard deviation times the fourth multiplier when the neighbor pixels cover the non-flat region.

14. The defect pixel correction system of claim 11, wherein the replacement component further comprises a flat replacement component that replaces the value of the given pixel from the image data with the central tendency measure of the values of the neighbor pixels to output the modified image data when the neighbor pixels are detected to cover the flat region.

15. The defect pixel correction system of claim 1, wherein the defect detection component further comprises a static identification component that checks whether the given pixel is specified as being defective in a static defect pixel map.

16. The defect pixel correction system of claim 1, wherein the replacement component further comprises:
a neighbor comparison component that respectively compares a subset of the values of the neighbor pixels to a high threshold and a low threshold, wherein the subset of the values of the neighbor pixels have yet to be processed, and wherein a remainder of the values of the neighbor pixels have been previously processed;
a neighbor replacement component that replaces, with a predefined temporary value, the values of the neighbor pixels from the subset that are respectively determined to be greater than the high threshold or less than the low threshold;
an edge computation component that computes magnitudes of a plurality of edges across the given pixel subsequent to replacement of the values of the neighbor pixels from the subset that are respectively determined to be greater than the high threshold or less than the low threshold;
a minimum detection component that identifies a minimum edge having a minimum magnitude from the magnitudes of the plurality of the edges; and
a value exchange component that replaces the value of the given pixel from the image data with an average of the values of the neighbor pixels that belong to the minimum edge to output the modified image data.

17. The defect pixel correction system of claim 16, wherein the edge computation component computes a particular magnitude of a particular edge across the given pixel as an absolute value of a difference between the values of the neighbor pixels that belong to the particular edge.

18. The defect pixel correction system of claim 1 comprised in the image sensor.

19. The defect pixel correction system of claim 1 comprised in an image signal processor.

20. A method of correcting defect pixels in image data collected by a pixel array of an image sensor with spatially arranged exposures, comprising:
receiving an exposure ratio for the pixel array, wherein the exposure ratio is a ratio of a first exposure time of a first subset of pixels of the pixel array to a second exposure time of a second subset of the pixels of the pixel array;
adjusting a value of at least a particular neighbor pixel of a given pixel from the image data based upon the exposure ratio, wherein neighbor pixels of the given pixel comprise the particular neighbor pixel, adjusting the value of the particular neighbor pixel within a particular Bayer domain if and only if:
the first exposure time differs from the second exposure time; and
the particular neighbor pixel is exposed for one of the first exposure time or the second exposure time and the given pixel is exposed for the other one of the first exposure time or the second exposure time;
computing neighborhood statistics for the given pixel from the image data based on values of the neighbor pixels of the given pixel from the image data as adjusted;
detecting whether a value of the given pixel from the image data is defective based upon the neighborhood statistics; and replacing the value of the given pixel from the image data when detected to be defective to output modified image data.

21. The method of claim 20, further comprising:
determining whether the given pixel is comprised in one of the first subset of the pixels having the first exposure time or the second subset of the pixels having the second exposure time;
subtracting a black level from the value of the particular neighbor pixel to compute a remaining value of the particular neighbor pixel;
scaling the remaining value of the particular neighbor pixel as a function of the exposure ratio to compute a scaled value of the particular neighbor pixel, wherein the scaled value of the particular neighbor pixel is computed by one of multiplying the remaining value of the particular neighbor pixel by the exposure ratio or dividing the remaining value of the particular neighbor pixel by the exposure ratio; and
adding the black level to the scaled vale of the particular neighbor pixel to output an adjusted value of the particular neighbor pixel.

22. The method of claim 20, wherein the neighbor pixels and the given pixel belong to a particular Bayer domain, and wherein each of the neighbor pixels of the given pixel is one of vertically, horizontally, or diagonally adjacent to the given pixel within the particular Bayer domain.

23. The method of claim 20, further comprising:
when the first exposure time differs from the second exposure time, detecting whether a condition exists; and
upon detection of the existence of the condition, inhibiting replacement of the value of the given pixel from the image data regardless whether detected to be defective.

24. The method of claim 23, wherein the condition comprises the neighbor pixels cover a high frequency region.

25. The method of claim 23, wherein the condition comprises:
the given pixel has a short exposure time; and
one or more of:
the value of the given pixel is less than a predefined dark threshold; or
at least one of the neighbor pixels having a long exposure time has a value above a predefined saturation value.

26. An image sensor, comprising:
a pixel array;
a buffer that retains image data collected by the pixel array; and
a defect pixel correction system, comprising:
a neighborhood pre-processing component that receives an exposure ratio for the pixel array and adjusts a value of at least a particular neighbor pixel of a given pixel from the image data based upon the exposure ratio, wherein the exposure ratio is a ratio of a first exposure time of a first subset of pixels of the pixel array to a second exposure time of a second subset of the pixels of the pixel array, wherein neighbor pixels of the given pixel comprise the particular neighbor pixel, wherein the neighbor pixels and the given pixel belong to a particular Bayer domain, and wherein each of the neighbor pixels of the given pixel is one of vertically, horizontally, or diagonally adjacent to the given pixel within the particular Bayer domain;
a neighborhood analysis component that computes neighborhood statistics for the given pixel from the image data based on values of the neighbor pixels of the given pixel from the image data as adjusted;
a defect detection component that detects whether a value of the given pixel from the image data is defective based upon the neighborhood statistics;
a replacement component that replaces the value of the given pixel from the image data when detected to be defective to output modified image data; and
an exception component that detects whether a condition exists when the first exposure time differs from the second exposure time, wherein the exception component, upon detection of the existence of the condition, inhibits replacement of the value of the given pixel from the image data regardless whether detected to be defective.

* * * * *